(12) United States Patent
Sawada

(10) Patent No.: US 10,432,723 B2
(45) Date of Patent: Oct. 1, 2019

(54) STORAGE SERVER AND STORAGE SYSTEM

(71) Applicant: Toshiba Memory Corporation, Minato-ku, Tokyo (JP)

(72) Inventor: Takanori Sawada, Kamakura Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 390 days.

(21) Appl. No.: 15/216,992

(22) Filed: Jul. 22, 2016

(65) Prior Publication Data

US 2017/0070574 A1    Mar. 9, 2017

Related U.S. Application Data

(60) Provisional application No. 62/214,155, filed on Sep. 3, 2015.

(51) Int. Cl.
*G06F 15/167* (2006.01)
*H04L 29/08* (2006.01)

(52) U.S. Cl.
CPC ........ *H04L 67/1097* (2013.01); *G06F 15/167* (2013.01)

(58) Field of Classification Search
CPC ............................ H04L 67/1097; G06F 15/167
USPC ........................................................ 709/216
See application file for complete search history.

(56) References Cited

U.S. PATENT DOCUMENTS

| 7,249,240 | B2 |  | 7/2007 | Nakagawa et al. |
| 7,613,747 | B1 | * | 11/2009 | Thakur ............... G06F 11/1456 707/640 |
| 7,725,654 | B2 |  | 5/2010 | Jacobson et al. |
| 7,769,823 | B2 | * | 8/2010 | Jenny ...................... H04L 29/06 709/219 |
| 7,949,637 | B1 | * | 5/2011 | Burke ................... G06F 3/0605 707/655 |
| 8,001,352 | B1 | * | 8/2011 | Chatterjee ............. G06F 3/0607 711/114 |
| 8,006,111 | B1 | * | 8/2011 | Faibish ................. G06F 1/3221 713/324 |
| 8,549,226 | B2 | * | 10/2013 | Ari ....................... G06F 12/0888 711/117 |
| 8,560,801 | B1 | * | 10/2013 | Pendharkar ............ G06F 3/061 711/153 |
| 8,566,549 | B1 | * | 10/2013 | Burke ................... G06F 3/0611 711/114 |
| 8,775,368 | B1 | * | 7/2014 | Burke ................... G06F 16/122 707/609 |

(Continued)

*Primary Examiner* — Imad Hussain
(74) *Attorney, Agent, or Firm* — White & Case LLP

(57) ABSTRACT

According to one embodiment, a storage server includes first tiered storage devices, a network interface and a processor. The network interface communicates with each of a client and another storage server through a network. The other storage server includes second tiered storage devices. The processor reads, when a read request is received from the client, data designated by the read request from the first tiered storage devices, and transmits the read data to the client. The processor relocates data among the first tiered storage devices and transmits information indicative of data placement in the first tiered storage devices after the relocation of the data as a hint for data relocation among the second tiered storage devices, to the other storage server.

16 Claims, 17 Drawing Sheets

(56) References Cited

U.S. PATENT DOCUMENTS

| Patent/Publication | Date | Inventor | Classification |
|---|---|---|---|
| 8,782,324 B1* | 7/2014 | Chen | G06F 12/0238 711/102 |
| 8,838,887 B1* | 9/2014 | Burke | G06F 3/0611 711/112 |
| 8,954,671 B2* | 2/2015 | Maki | G06F 3/0611 711/117 |
| 8,976,636 B1* | 3/2015 | Martin | G06F 3/0611 369/30.01 |
| 9,319,265 B2* | 4/2016 | Bloomstein | H04L 29/08801 |
| 9,323,655 B1* | 4/2016 | Sahin | G06F 12/023 |
| 9,323,682 B1* | 4/2016 | Marshak | G06F 12/0868 |
| 9,400,792 B1* | 7/2016 | Bono | G06F 9/5016 |
| 9,459,809 B1* | 10/2016 | Chen | G06F 3/0644 |
| 9,665,630 B1* | 5/2017 | Bigman | G06F 3/061 |
| 9,684,593 B1* | 6/2017 | Chen | G06F 12/128 |
| 9,778,852 B1* | 10/2017 | Marshak | G06F 3/0611 |
| 9,965,381 B1* | 5/2018 | Sahin | G06F 12/023 |
| 10,001,927 B1* | 6/2018 | Trachtman | G06F 3/061 |
| 2003/0126232 A1 | 7/2003 | Mogul et al. | |
| 2007/0185934 A1* | 8/2007 | Cannon | G06F 11/1469 |
| 2010/0121940 A1* | 5/2010 | Reeser | H04L 67/2852 709/219 |
| 2012/0072662 A1* | 3/2012 | Jess | G06F 12/0653 711/114 |
| 2012/0072670 A1* | 3/2012 | Jess | G06F 12/0868 711/136 |
| 2012/0096106 A1* | 4/2012 | Blumofe | G06Q 50/00 709/213 |
| 2012/0271906 A1* | 10/2012 | Reeser | H04L 67/2852 709/213 |
| 2013/0132674 A1* | 5/2013 | Sundrani | G06F 12/0804 711/122 |
| 2013/0204961 A1* | 8/2013 | Fliam | H04L 67/2885 709/214 |
| 2013/0326183 A1* | 12/2013 | Bavishi | G06F 3/0647 711/165 |
| 2013/0326545 A1* | 12/2013 | Bavishi | G06F 16/214 719/328 |
| 2013/0326546 A1* | 12/2013 | Bavishi | G06F 16/214 719/328 |
| 2014/0074963 A1* | 3/2014 | Reeser | H04L 67/2852 709/216 |
| 2014/0189140 A1* | 7/2014 | Takahashi | H04L 65/60 709/231 |
| 2014/0189196 A1* | 7/2014 | Kelkar | G06F 12/16 711/102 |
| 2014/0244747 A1* | 8/2014 | Aggarwal | H04L 67/22 709/204 |
| 2014/0244937 A1* | 8/2014 | Bloomstein | H04L 29/08801 711/136 |
| 2015/0100667 A1* | 4/2015 | Freyria | H04L 67/06 709/219 |
| 2015/0149580 A1* | 5/2015 | Reeser | H04L 67/2852 709/213 |
| 2015/0264153 A1* | 9/2015 | Anand | H04L 67/2852 709/212 |
| 2015/0350370 A1* | 12/2015 | Lepeska | G06F 16/00 709/219 |
| 2016/0094471 A1* | 3/2016 | Newton | H04L 67/2842 709/226 |
| 2016/0248879 A1* | 8/2016 | Fliam | H04L 67/2885 |
| 2016/0320980 A1* | 11/2016 | Fang | G06F 3/0611 |
| 2016/0359995 A1* | 12/2016 | Reeser | H04L 67/2852 |
| 2018/0034929 A1* | 2/2018 | Reeser | H04L 67/2852 |

* cited by examiner

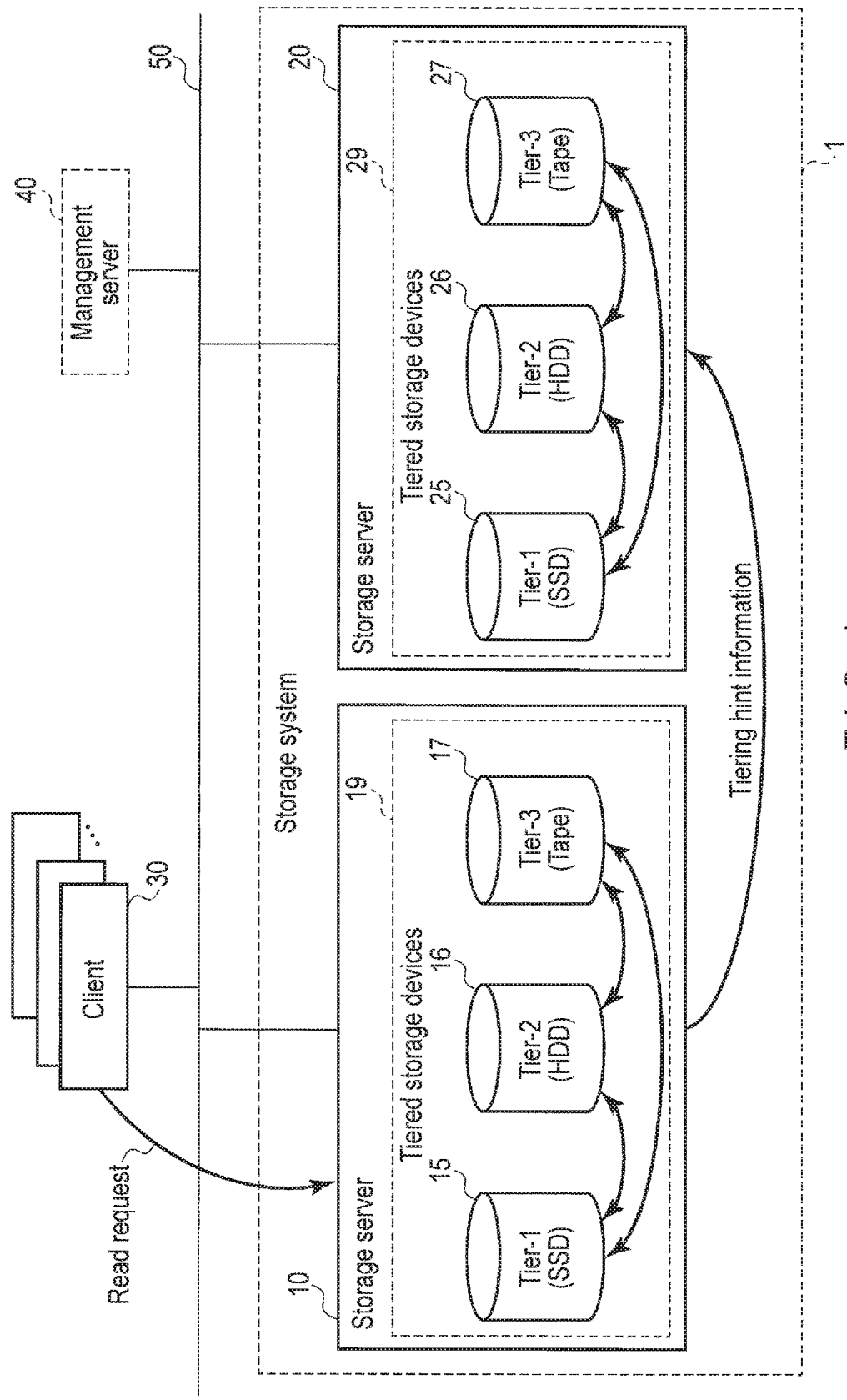
F I G. 1

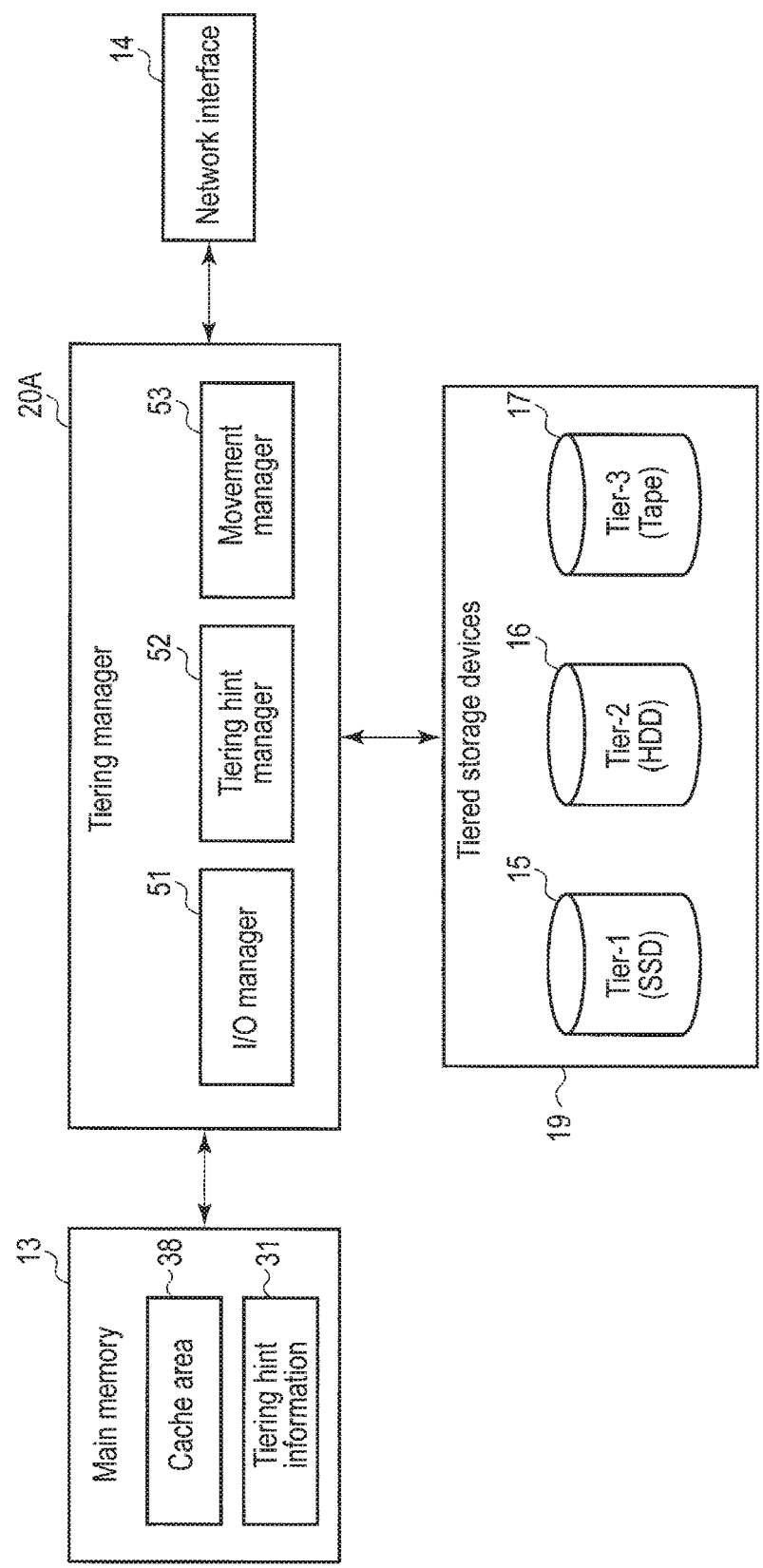
F I G. 6

| Entry ID | Target | Tier level | Operation | Priority | ... |
|---|---|---|---|---|---|
| #1 | ... | ... | ... | ... | ... |
| #2 | ... | ... | ... | ... | ... |
| ⋮ | ⋮ | ⋮ | ⋮ | ⋮ | ⋮ |
| #N | ... | ... | ... | ... | ... |

F I G. 7

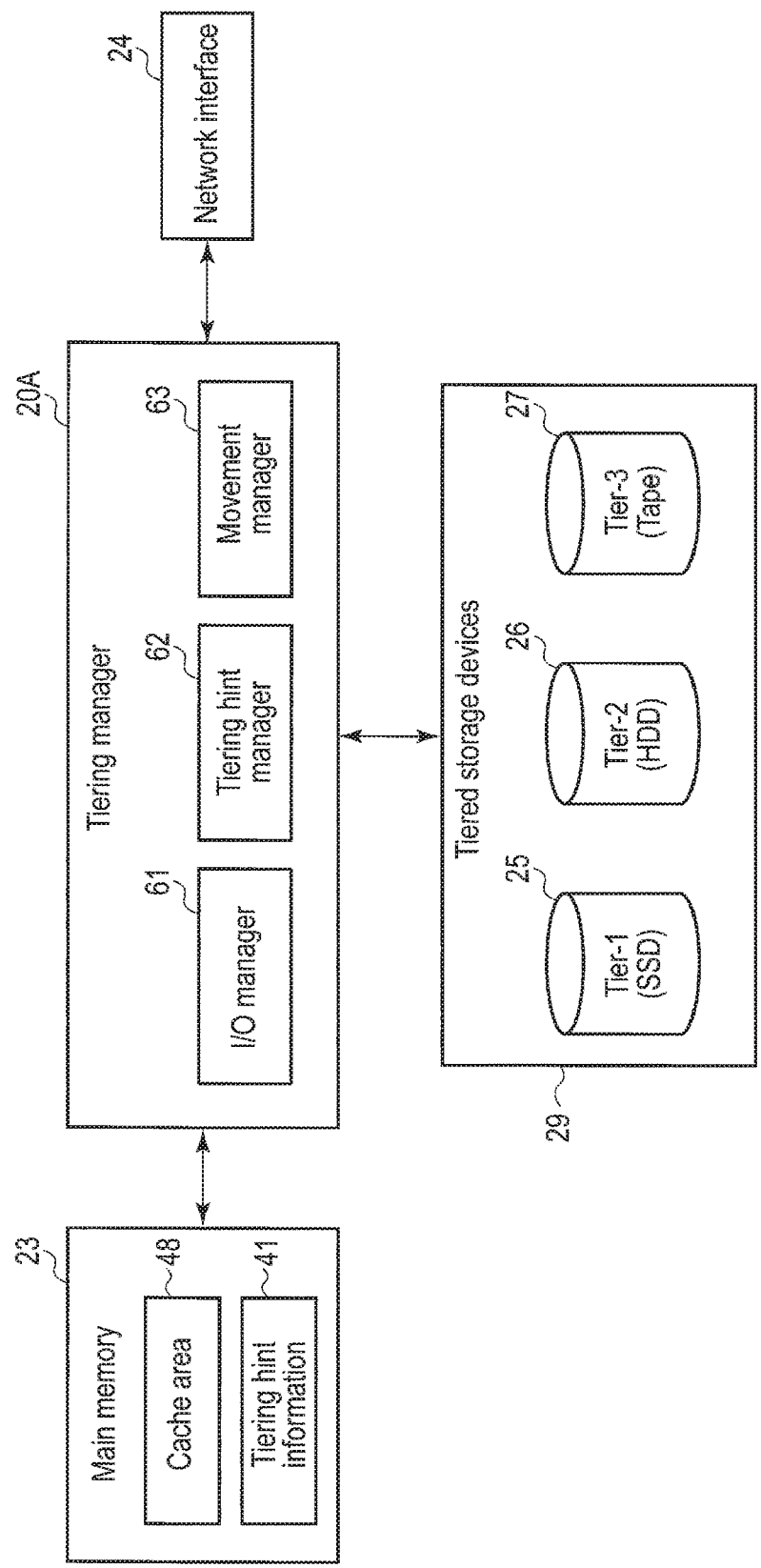
F I G. 8

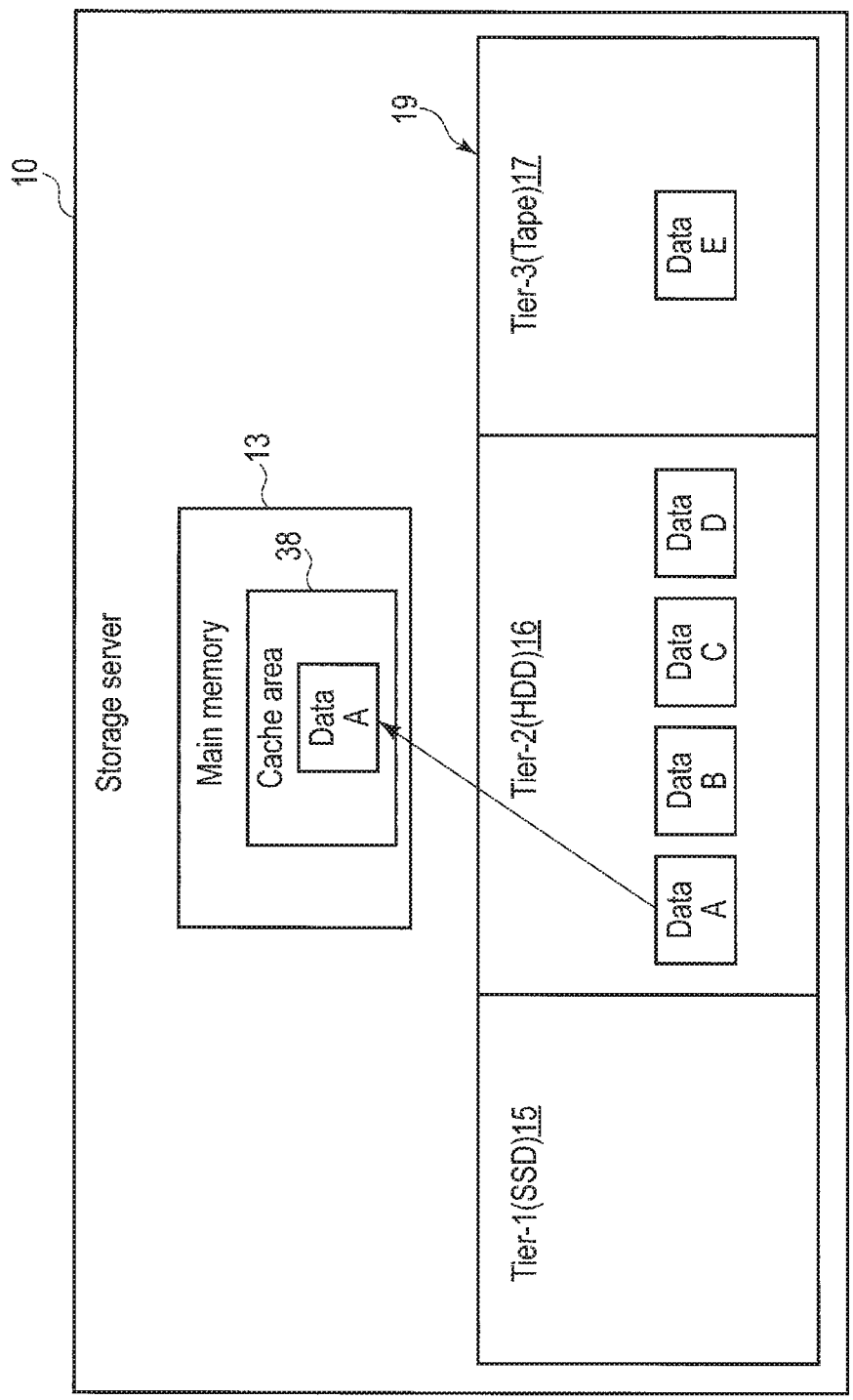
F I G. 9

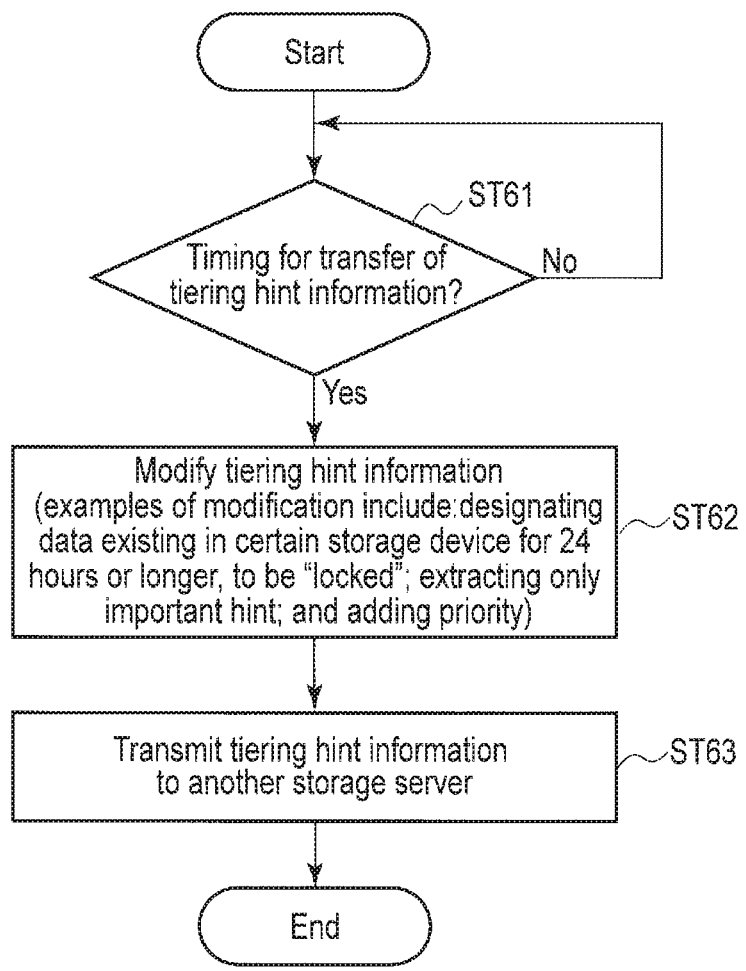
F I G. 14

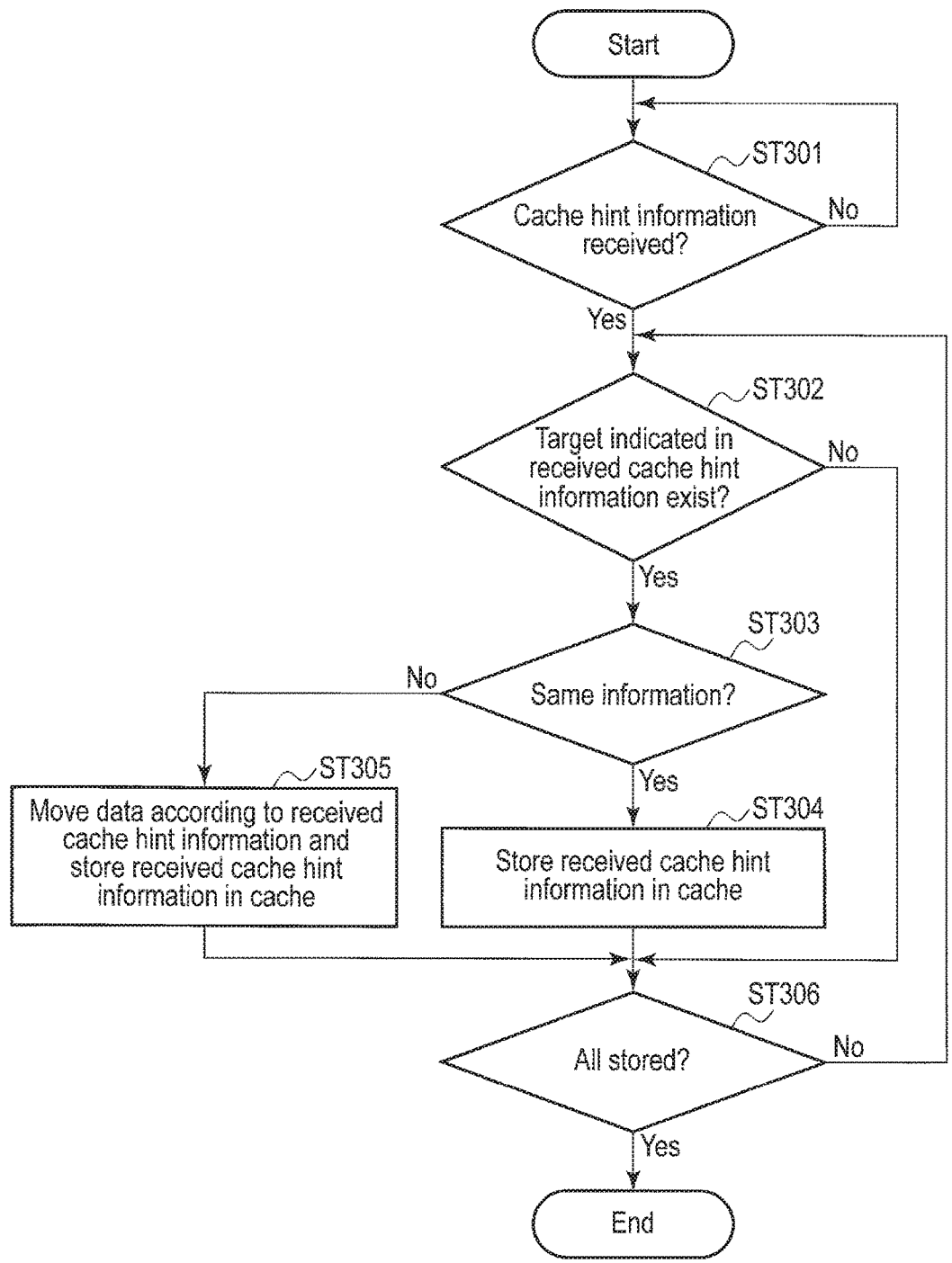
F I G. 18

STORAGE SERVER AND STORAGE SYSTEM

CROSS-REFERENCE TO RELATED APPLICATIONS

This application claims the benefit of U.S. Provisional Application No. 62/214,155, filed Sep. 3, 2015, the entire contents of which are incorporated herein by reference.

FIELD

Embodiments described herein relate generally to a technique to provide clients with services for accessing data via a network.

BACKGROUND

In recent years, various storage systems for providing a service for accessing data through a network for clients are used widely.

More recently, as the quantity of access to storage systems increases, there rises a demand of improving the data input/output performance of storage systems.

BRIEF DESCRIPTION OF THE DRAWINGS

FIG. 1 is a block diagram showing a structure example of a storage system according to an embodiment.

FIG. 6 is a block diagram snowing an example of a functional structure of a tiering manager operating on the storage server of FIG. 2.

FIG. 7 is a diagram showing an example of tiering hint information transmitted from the storage server of FIG. 2 to the storage server of FIG. 3.

FIG. 8 is a block diagram showing an example of a functional structure of a tiering manager operating on the storage server of FIG. 3.

FIG. 9 is a diagram showing an example in which data designated by a read request as stored in a cache area of a main memory in the storage server of FIG. 2.

FIG. 14 is a flowchart showing an example of the procedure of a hint transfer process executed by the processor (CPU) an the storage server of FIG. 2.

FIG. 18 is a flowchart showing an example of another procedure of the data relocation process executed by the processor (CPU) in the storage server of FIG. 3.

DETAILED DESCRIPTION

Figure 2:
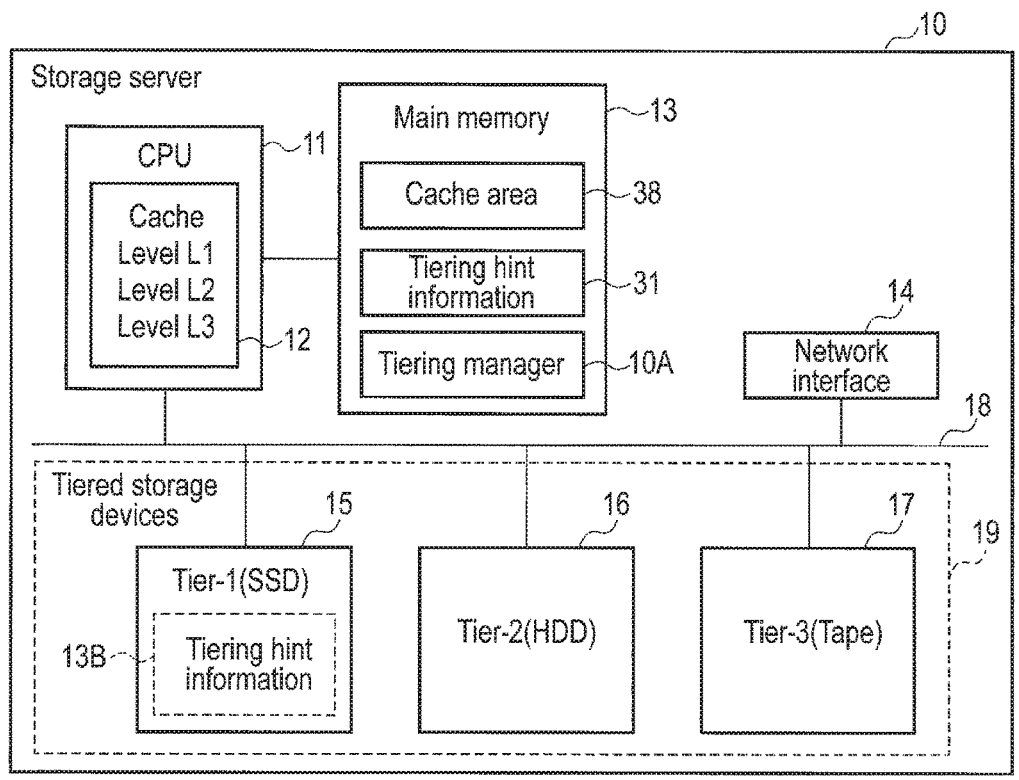
FIG. 2 is a block diagram showing a structure example of a storage server in the storage system of FIG. 1.

Various embodiments will be described hereinafter with reference to the accompanying drawings.

In general, according to one embodiment, a storage server comprises first tiered storage devices, a network interface and a processor. The first tiered storage devices include at least a first storage device and a second storage device. The first storage device is associated with a first tier level. The second storage device is associated with a second tier level and has an access speed slower than that of the first storage device.

The network interface communicates with each of a client and another storage server through a network. The other storage server includes second tiered storage devices.

The processor controls the first tiered storage devices and the network interface.

The processor reads, when a read request is received from the client, through the network interface, data designated by the read request from the first tiered storage devices, and transmits the read data to the client through the network interface.

The processor relocates data among the first tiered storage devices by moving first data of first access frequency from the second storage device to the first storage device and moving second data of second access frequency lower than the first access frequency from the first storage device to the second storage device. The processor transmits first information indicative of data placement in the first tiered storage devices after the relocation of the data as a hint for data relocation among the second tiered storage devices, to the other storage server through the network interface.

First Embodiment

FIG. 1 shows a brief structure example of a storage system 1 according to an embodiment.

The storage system 1 provides a service (for example, the read-only service) for accessing data through a network 50 for each of clients 30.

As shown in FIG. 1, the storage system 1 comprises storage servers 10 and 20. Each of the storage servers 10 and 20 is connected to the network 50. The network 50 may be, for example, Ethernet (registered trademark) or may be InfiniBand, but not particularly limited to these. Here, InfiniBand is an open-standard interconnect, protocol defined by InfiniBand Trade Association (IBTA).

Furthermore, the storage system. 1 may adopt the system configuration that each of the storage servers 10 and 20 is managed by a management server 40 or that the management server 40 is not used. In the system configuration in which the management server 40 is not used, the setting and management of each of the storage servers 10 and 20 may be executed by a terminal connected to the network 50.

For simplifying the illustration, FIG. 1 shows the case where the storage system 1 includes two storage servers 10 and 20. Note that the number of storage servers included in the storage system 1 is not limited to two, but the storage system 1 may include three or more storage servers.

The storage server 10 is a server that is executing the above-described service such as read-only service. On the other hand, the storage server 20 is a server which has not yet started the above-described service. The storage devices of the storage server 20 may store the same data as those stored in the storage devices of the storage server 10. In this case, the storage server 20 can function as a hot standby server set up to be able to start the above-described service immediately.

The storage devices of the storage server 20 may store the data obtained by compressing the data stored in the storage devices of the storage server 10.

While the storage server 10 is executing the above-described service and the storage server 20 is being in a standby state in which the storage server 20 has not started service yet, all read requests transmitted from the clients 30 via the network 50 are directed to the storage server 10.

Each of the clients 30 can be realized by an arbitrary computing device such as a personal computer, tablet or a portable terminal. Each client 30 transmits a read request to get data to the storage server 10 via the network 50 according to the user's operation. Each client 30 receives this data from the storage server 10 via the network 50. Each client 30 may display the received data on the display of the client 30, or may store it in the local storage of the client 30.

The storage server 10 may comprise multiple storage devices. These storage devices may be built in the housing of the storage server 10, or may be connected to the housing of the storage server 10 via an interface such as a fiber channel.

FIG. 1 illustrates an example case where the storage server 10 comprises three types of storage devices 15, 16 and 17. The storage devices 15, 16 and 17 may be plural types of storage media which differ from each other in relationship between the cost (price) per a certain capacity and the access speed I/O performance).

The storage device 15 is a faster storage device which has the quickest access speed and is associated with a first tier level (tier-level 1). The storage device 15 may be a storage device equipped with a semiconductor memory such as a NAND flash memory, that is, for example, a NAND flash technology-based solid-state drive (SSD).

The storage device 16 is a storage device which has an access speed slower than that of the storage device 15 of the tier-level 1, and is associated with a second tier level (tier-level 2). The storage device 16 may be a storage device comprising a rotating magnetic disk medium, for example, a hard disk drive (HDD).

The storage device 17 is a storage device which has an access speed slower than that of the storage device 16 of the tier-level 2, and is associated with a third tier level (tier-level 3). This storage device 17 may be a different type of HDD from the storage device 16 of the tier-level 2, or may be a large-capacity tape storage device (tape drive).

In terms of the cost (price) per a certain capacity, the storage device 15 (SSD) is the highest, the storage device 17 (tape storage device) is the lowest, and the storage device 16 (HDD) is in between.

The storage device 15 (SSD), the storage device 16 (HDD) and the storage device 17 (tape storage device) function as tiered storage devices 19. The tiered storage devices 19 store a great quantity of data, such as a large number of files.

When the storage server 10 receives a read request via the network 50 from a certain client 30, the storage server 10 read the data designated by this read request from the tiered storage devices 19 (the storage device 15 (SSD), storage device 16 (HDD) or storage device 17 (tape storage device)). Then, the storage server 10 transmits the read data to the client 30 via the network 50.

Further, the storage server 10 has an automatic storage tiering function. The automatic storage tiering function learns the access frequency of data based on the read requests and optimizes the data placement in the tiered storage devices 19. In more detail, the automatic storage tiering function places data with high access frequency in the storage device 15 (SSD), data with low access frequency in the storage device 17 (tape storage device), and data with middle access frequency in the storage device 16 (HDD). Thus, the data are automatically relocated among the tiered storage devices 19. The operation for this data relocation may include an operation of moving high-access-frequency data from the tier-level 2 or tier-level 3 to the tier-level 1, and an operation of moving data with lowered access frequency from the tier-level 1 to the tier-level 2 or tier-level 3. As a result, the data with high possibility to be read-accessed by the clients 30 can be moved to the tier-level 1 (high-performance tier), that is, the storage device 15 (SSD). In this manner, data with high possibility to be read-accessed by the clients 30 can be provided more quickly to the clients 30, and thus the performance of above-described service of the storage system 1 can be improved.

Furthermore, data which are to be hardly accessed can be moved to the tier-level 3 (low cost tier), that is, the storage device 17 (tape storage device). In this manner, it is possible to prevent such a situation from occurring, that storage areas required to store data to be hardly accessed are continuously allocated in the storage device of the tier-level 1 or tier-level 2. Thus, the storage space in a storage device of the tier-level 1 or tier-level 2 can be used efficiently.

Moreover, the automatic storage tiering function may have a lock function. The lock function is a function to lock (hold) a certain data in an arbitrary tier level. The data locked in a certain tier level will not be moved to another tier level, but held at this tier level even if the access frequency of this data changes.

In the above-provided description, three tier levels were realized by the tiered storage devices 19, but the number of the tier levels contained in the tiered storage devices 19 may be two, or four or more.

The storage server 20 has a structure similar to that of the storage server 10.

That is, the storage server 20 comprises storage devices 25, 26 and 27. The storage device 25 is a faster storage device which has the quickest access speed and is associated with the first tier level (tier-level 1). This storage device 25 may be a NAND flash technology-based, solid-state drive (SSD).

The storage device 26 is a storage device which has an access speed slower than that of the storage device 25 of the tier-level 1, and is associated with the second tier level (tier-level 2). This storage device 26 may be a hard disk drive (HDD).

The storage device 27 is a storage device which has an access speed slower than that of the storage device 26 of the tier-level 2, and is associated with the third tier level (tier-level 3). This storage device 27 may be a large-capacity tape storage device (tape drive).

Furthermore, the storage server 10 has a tiering hint information transfer function in order that the storage server 20 can demonstrate performance equivalent to that of the storage server 10 from immediately after the storage server 20 starts service.

The tiering hint transfer function is a function to make optimized current data placement among the tiered storage devices 19 in the storage server 10 reflected in the data placement among the tiered storage devices 29 in the storage server 20.

In more detail, by the tiering hint transfer function, first information (tiering hint information) indicating a data placement in the tiered storage devices 19 after relocation of data is transmitted to the storage server 20 as a hint about the data relocation among the tiered storage devices 29 in the storage server 20. The storage server 20 has a data relocation function to relocate data among the tiered storage devices 29 in the storage server 20 based on the tiering hint information received from the storage server 10. Note that the tiering hint information may also be called as cache hint information.

The current data placement among the tiered storage devices 19 in the storage server 10 is already optimized by the learning based on the read requests from the clients 30. Thus, the tiering hint transfer function and the data relocation function make it possible to quickly optimize the data placement among the tiered storage devices 29 in the storage server 20.

When there is data locked in a certain tier level by the above-described lock function, the tiering hint information may also further include data indicating that the data is locked in this tier level. In this manner, the storage devices 29 can move the same data as this data to an appropriate tier level, hut not only that, it can also lock it in this appropriate tier level.

After the storage server, which should execute the above-described service, is switched from the storage server 10 to the storage server 20, all the read requests from the clients 30 transmitted via the network 50 are directed to the storage server 20. That is, the storage server to accept read requests is switched to the storage server 20, and then the storage server 20 starts the above-described service.

In the storage server 20, the data with high access frequency is already moved to the storage device 25 (SSD) based on the received tiering hint information. Therefore, the storage server 20 can make a quick response to the read request from each client 30 from immediately after starting the service.

The management server 40 may execute the control for switching the storage server to execute the above-described service from the storage server 10 to the storage server 20.

In this case, when the storage server to execute the above-described service should be switched from the storage server 10 to the storage server 20, the management server 40 may transmit to the storage server 10 the tiering hint information transfer request which requests to tiering hint information be transmitted to the storage server 20.

Or the management server 40 may transmit to the storage server 10 schedule data which specifies when (for example, date and time) the tiering hint information should be transmitted to the storage server 20. When the date and time specified with the schedule data comes, the storage server 10 automatically transmits the tiering hint information to the storage server 20.

Or the management server 40 may have a function to detect whether a failure occurred in a part of the storage server 10. More specifically, the management server 40 may receive the state of the storage server 10 from the storage server 10 or may detect whether a failure occurred in a part of the storage server 10 based on the received state. Here, the examples of the failure may include an increase in the had storage area contained in a certain storage device of the storage server 10, an increase of the number of times of retries regarding communication between a client 30 and the storage server 10, etc. When a failure occurs in a part of the storage server 10, the management server 40 may transmit to the storage server 10 the tiering hint information transfer request which requests tiering hint information be transmitted to the storage server 20.

In addition, the storage server 10 itself may have the function to detect whether a failure occurred in a part of the storage server 10. In this case, the storage server 10 may transmit tiering hint information to the storage server 20 when a failure occurs in a part of the storage server 10.

Furthermore, the management server 40 may execute processing of adding software via the network 50 to the storage server 10 and the storage server 20, for example, according to an administrator's instruction. Note that the storage server 10 comprises an automatic software updating function, and therefore it is possible to constitute the storage server 10 to automatically execute processing of adding software. By the automatic updating function, for example, the storage server 10 executes upgrading of software. The management server 40 may transmit to the storage server 10 the tiering hint information transfer request which requests tiering hint information be transmitted to the storage server 20 after software is added to the storage server 10. Further, the storage server 10 may transmit tiering hint information to the storage server 20 after adding (upgrading) software by the automatic updating function.

FIG. 2 briefly shows an example of the system configuration of the storage server 10.

As shown in FIG. 2, the storage server 10 comprises a CPU 11, a main memory 13, a network interface 14 and the tiered storage devices 19. The CPU 11, the main memory 13, the network interface 14, and the tiered storage devices 19 are each connected to a bus 18.

The CPU 11 is a processor to control each component in the storage server 10. The CPU 11 may include a cache 12. The cache 12 may contain, for example, three caches of a level 1 (L1), a level 2 (L2) and a level 3 (L3).

The CPU 11 executes various programs loaded from the tiered storage devices 19 to the main memory 13. These programs include the operating system (OS) and a service program. The read-only service, automatic storage tiering function and tiering hint information transfer function described above may be executed by the hardware including the CPU 11 and, a tiering manager 10A in this service program.

The tiered storage devices 19 store numerous data sets such as a large number of files. As described above, the tiered storage devices 19 include the storage device 15 (SSD) associated with the first tier level (tier-level 1) and the storage device 16 (HDD) associated with the second tier level (tier-level 2). The tiered storage devices 19 may further include the storage device 17 (tape storage device) associated with the third tier level (tier-level 3). Among the tiered storage devices 19, data are distributed over the storage device 15 (SSD), storage device 16 (HDD) and storage device 17 (tape storage device). In other words, certain, data is stored exclusively in one of the tiered storage devices 19.

The same data as that stored in a certain storage device of the tiered storage devices 19 does not exist in the other storage devices of the tiered storage devices 19.

The main memory 13 has an access speed faster than that of the storage device 15 (SSD). The main memory 13 is, for example, a double-data-rate SDRAM (DDR SDRAM). The storage area of the main memory 13 includes a cache area 38. The storage area of the main memory 13 may further include an area where the tiering hint information 31 is stored.

The cache area 38 functions as a memory cache (DRAM cache) configured to cache data read from the tiered storage devices 19. Since the cache area 38 is a volatile memory, while data remaining in the tiered storage devices 19, a copy of the data is stored in the cache area 38.

If data designated by a read request from a client 30 exists in the storage device 15 (SSD), the data is read from the storage device 15 (SSD) and a copy of the data is then stored in the cache area 38. Or, if the data designated by the read request exists in the storage device 16 (HDD), the data is read from the storage device 16 (HDD) and a copy of the data is stored in the cache area 38. Or, if the data designated by the read request exists in the storage device 17 (tape storage device), the data is read from the storage device 17 (tape storage device) and a copy of the read data is stored in the cache area 38.

When there is no free space to store the read data in the cache area 38, data targeted to be evicted from the cache area 38 is selected according to, for example, least recently used (LRU) scheme. The read data is stored in the free space in the cache area 38, obtained by removing (invalidating) the data to be evicted.

When the CPU it receives a following read request from the client 30 via the network interface 14, the CPU 11 determines whether the data designated by the following read request is present in the cache area 38. If the data designated by following read request is present in the cache area 38 (cache hit), the CPU 11 can read this data immediately from the cache area 38, and therefore can respond to the read request at high speed.

The above-described tiering hint information 31 transmitted from the storage server 10 to the storage server 20 may include not only the data indicative of the current optimized data placement obtained by the data relocation among the storage devices 19, but also the information indicative of the data stored in the cache area 38. Based on the tiering hint information 31 received from the storage server 10, the storage server 20 can optimize the data placement among the tiered storage devices 29 in the storage server 20 and also prefetch the data recently accessed to a memory cache (DRAM cache) in the storage server 20.

In the storage server 10, the tiering hint information 31 may be stored in the storage device 15 (SSD) In this case, even if power failure occurs in the storage server 10, the tiering hint information 31 can be retained.

The network interface 14 is configured to communicate through the network 50 with each of the clients 30, the storage server 20 and the management server 40. More specifically, the network interface 14 executes processing for receiving data from the storage server 20, the client 30 or the management server 40 via the network 50 under the control of the CPU 11. Further, the network interface 14 executes processing for transmitting data to the storage server 20, the client 30 or the management server 40 via the network 50 under the control of the CPU 11.

Figure 3:
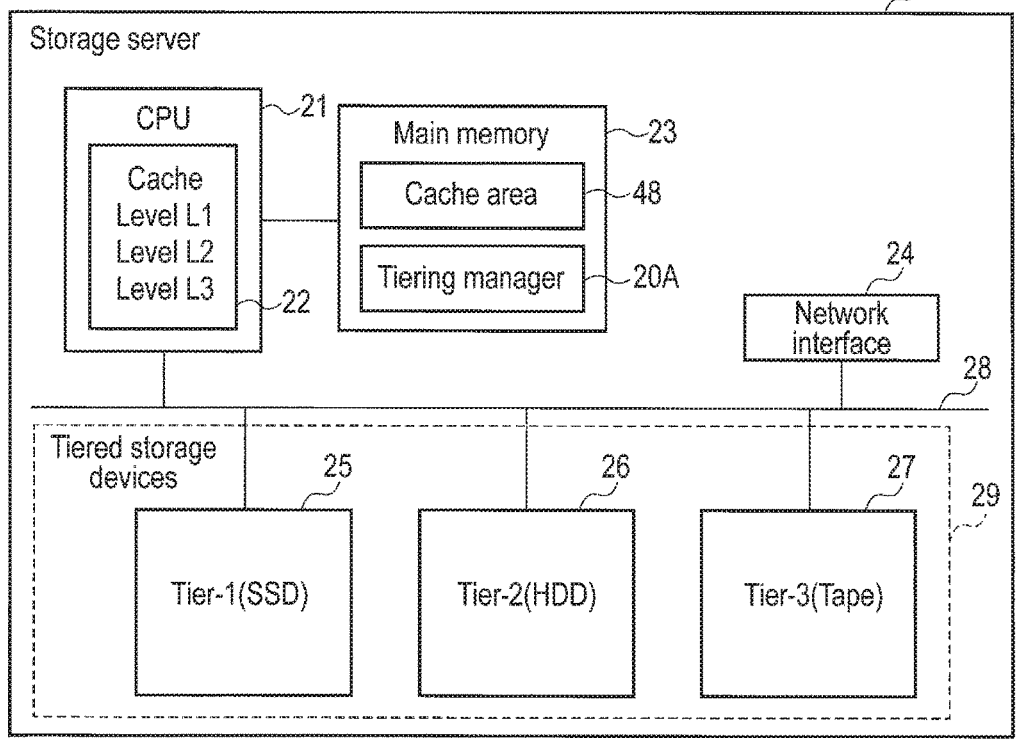
FIG. 3 is a block diagram showing a structure example of another storage server in the storage system of FIG. 1.

FIG. 3 briefly shows an example of the system configuration of the storage server 20. The storage server 20 comprises a CPU 21 including a cache 22, a main memory 23, a network interface 24 and tiered storage devices 29 as in the case of the storage server 10. The CPU 21, the main memory 23, the network interface 24 and the tiered storage devices 29 are each connected to a bus 28.

Note that FIG. 3 illustrates the case where the storage server 20 has the same structure as that of the storage server 10, but the embodiments are not limited to this. For example, the storage server 20 may further include an additional structure (for example, storage device) to the structure of the storage server 10, or may be of such a structure that the storage server 10 is partially replaced.

The CPU 21, the cache 22, the main memory 23, the network interface 24, the tiered storage devices 29, and the bus 28 operate similarly as the CPU 11, the cache 12, the main memory 13, the network interface 14, the tiered storage devices 19 and the bus 18 of the storage server 10 described above, respectively.

The CPU 21 controls each component in the storage server 20. The CPU 21 executes various programs loaded to the main memory 23 from the tiered storage devices 29. These programs include the operating system (OS) and a service program. The service program includes a tiering manager 20A. The tiering manager 20A has a data relocation function that operates based on the tiering hint information received from the storage server 10.

The tiered storage devices 29 include at least a storage device 25 (SSD) associated with the first tier level (tier-level 1), and a storage device 26 (HDD) associated with the second tier level (tier-level 2) and having an access speed slower than that of the storage device 25. The tiered storage devices 29 may further include the storage device 27 (tape storage device) which is associated with a third tier level (tier-level 3) and has an access speed slower than that of the storage device 26.

The main memory 23 has an access speed faster than that of the storage device 25 (SSD). The main memory 23 is, for example, a double-data-rate SDRAM (DDR SDRAM). The main memory 23A includes a cache area 48. The cache area 48 functions as a memory cache (DRAM cache) configured to cache the data read from the tiered storage devices 29. Since the cache area 48 is a volatile memory, while data remaining in the tiered storage devices 29, a copy of the data is stored in the cache area 48.

The network interface 24 is configured to communicate through the network 50 with each of the clients 30, the storage server 10 and the management server 40. More specifically, the network interface 24 executes processing for receiving data from the storage server 10, the client 30 or the management server 40 via the network 50 under the control of the CPU 21. Further, the network interface 24 executes processing for transmitting data to the storage server 10, the client 30 or the management server 40 via the network 50 under the control of the CPU 21.

Next, an example of the tiering hint information 31 generated and managed by the storage server 10 will be described with reference to FIG. 4.

Figure 4:
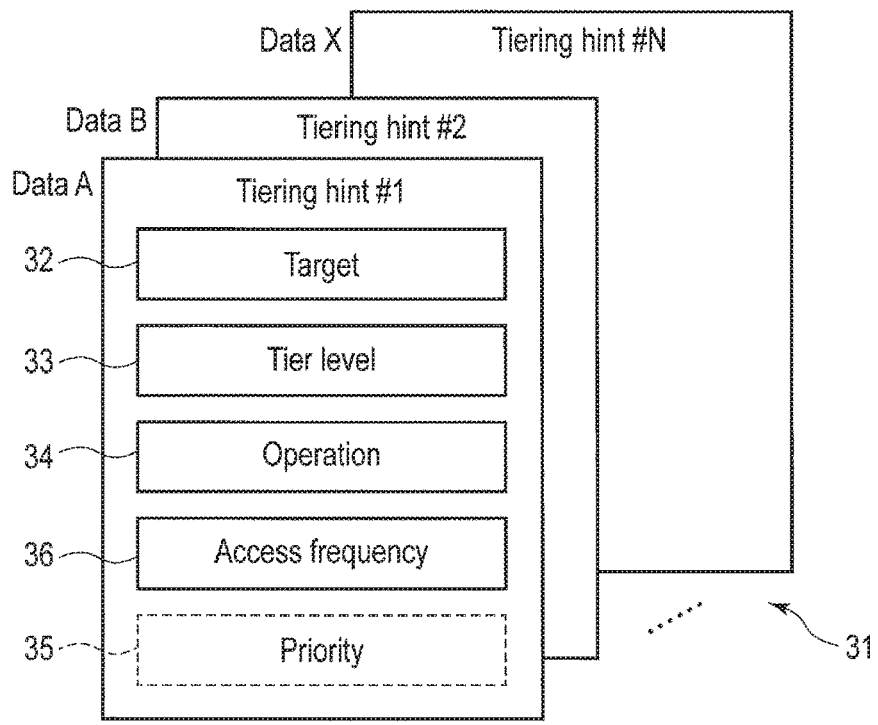
FIG. 4 is a schematic diagram showing an example of tiering hint information generated and managed by the storage server of FIG. 2.

As shown in FIG. 4, the tiering hint information 31 includes entries corresponding to data items (for example, data files). Each entry includes, for example, a target field 32, a tier level field 33, an operation field 34 and an access frequency field 36.

In the entry corresponding to a certain data item, the target field 32 indicates data ID for identifying the corresponding data item. The data ID may be, for example, a file name of a data file stored in the tiered storage devices 19. Note that if the storage server 10 is a key-value-store type storage server, the data ID may be a key associated with a value (data) or may be a range of keys. In the key-value-store storage server, a pair of a key and a value is stored in the storage device. According to some embodiments, the tiered storage devices 19 may take such a configuration that a key is stored in the storage device 15 (SSD) and a value (data) corresponding to the key stored in the storage device 15 (SSD) is stored in the storage device 16 (HDD). In this case, with reference to the key stored in the storage device 15 (SSD), the value (data) stored in the storage device 16 (HDD) can be specified quickly.

The tier level field 33 indicates the tier level of the storage device in which the corresponding data is stored. In this embodiment, the tier level field 33 indicates, for example, one of the first tier level (tier-level 1), the second tier level (tier-level 2) and the third tier level (tier-level 3). As described above, in the storage server 10, the storage device 15 (SSD) is associated with the tier-level 1, the storage device 16 (HDD) is associated with the tier-level 2, and the storage device 17 (tape storage device) is associated with the tier-level 3.

The operation field 34 indicates the operation to the corresponding data. This operation may be in conformity with, for example, an operation (command) used in an exclusive type data cache. In this case, the operation field 34 may indicate, for example, "prefetch", "invalidate" or "lock", or a combination of those.

The "prefetch" is an operation to relocate (move) data to a specified higher tier level (storage device). This data may not only be moved to the higher tier level (storage device), but also may be cached (prefetched) in the cache area 38.

The "invalidate" is an operation to relocate (move) data to the specified lower tier level and invalidate the data in the source tier level in this movement. If the data is also present in the cache area 38, the data in the cache area 38 may also be invalidated.

The "lock" is an operation used for the above-described lock function. That is, once data is locked at a tier level, the data will be retained at this tier level without being moved to some other tier level even if the access frequency of this data changes.

Note that if the cache area 38 of the main memory 13 is used as a write cache, the operation field 34 can indicate "write-back" and "write-back invalidate". The "write-back" indicates an operation which writes the data back to the tiered storage devices 19 from the cache area 38 if the data cached in the cache area 38 has been updated. Meanwhile, the "write-back invalidate" is an operation which writes the data back to the tiered storage devices 19 from the cache area 38 and invalidate the data stored in the cache area 38, if the data cached in the cache area 38 has been updated.

The access frequency field 36 indicates the access frequency of the corresponding data. The access frequency field 36 may indicate, for example, the number of times of access the data within the learning period (for example, 24 hours or 1 hour) for measuring the access frequency of the data. In another embodiment, the access frequency field 36 may indicate a hit rate of the corresponding data. The hit rate may indicate the number of times of hit of the memory cache regarding the data which occurred within the learning period (for example, 24 hours or 1 hour).

Each entry of the tiering hint information 31 may further include a priority field 35. The priority field 35 indicates the priority in which the corresponding data should be relocated. A value which expresses, for example, a degree of priority, such as "high", "medium" or "low" or a numerical value which indicates the degree of priority (priority order) is set to the priority field 35. The value may be set to the priority field 35, for example, when the tiering hint information 31 is transmitted to the storage server 20 from the storage server 10. The storage server 20 which received the tiering hint information 31 can execute the relocation processing of the data based on each entry in the order from the entry with a higher priority according to the value indicated in the priority field 35.

Note that the storage server 20 not only can receive the tiering hint information 31 from the storage server 10, but also generate tiering hint information indicating the data placement in the tiered storage devices 29 which optimized by the learning based on read requests to the storage server 20.

Figure 5:
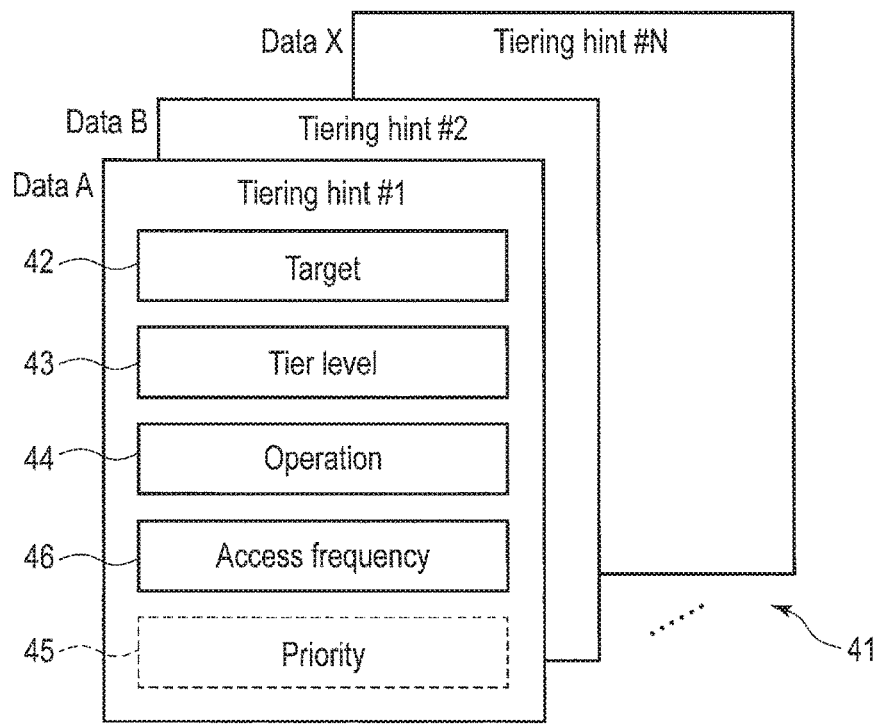
FIG. 5 is a schematic diagram showing an example of tiering hint information generated and managed by the storage server of FIG. 3.

FIG. 5 shows an example of the tiering hint information 41 generated and managed by the storage server 20. As shown in FIG. 5, the tiering hint information 41 includes entries corresponding to data items (for example, data files). Each entry includes, for example, a target field 42, a tier level field 43, an operation field 44, an access frequency field 46, and a priority field 45. These fields 42 to 46 indicate the same contents as those of the fields 32 to 36 in the tiering hint information 31 described above with reference to FIG. 4, respectively, and therefore explanations will be omitted.

FIG. 6 shows the functional structure of the tiering manager 10A which operates on the storage server 10.

The tiering manager 10A comprises an I/O manager 51, a tiering hint manager 52 and a movement manager 53. When a read request is received from a client 30 via the network interface 14, the I/O manager 51 reads the data designated by the read request from the cache area 38 (DRAM cache) or the tiered storage devices 19. The I/O manager 51 transmits the read data to the client 30 via the network interface 14. Further, the I/O manager 51 stores the data read from the tiered storage devices 19, in the cache area 38 (DRAM cache). When there is a free space in the DRAM cache 38, the I/O manager 51 stores in the free space the data read from the tiered storage devices 19. On the other hand, when there is no free space in the DRAM cache 38, the I/O manager 51 stores the data in an area dedicated by evicting data according to the LRU scheme, for example. An example of the operation of storing (caching) the data read from the tiered storage devices 19 in the DRAM cache 38 will be described later with reference to FIG. 9.

The tiering hint, manager 52 updates the access frequency of the data read from the cache area 38 (DRAM cache) or the tiered storage devices 19. That is, the tiering hint manager 52 updates the access frequency of the data designated by the read request. The tiering hint manager 52 may increment by one the value or the access frequency field 36 of the entry corresponding to the data contained in the tiering hint information 31, for example.

Note that if the entry corresponding to the data is not contained, in the tiering hint information 31, (that is, for example, at the first read access of the data), the tiering hint manager 52 generates a new entry corresponding to the data, and sets the value of the access frequency field 36 of the entry as 1. A data ID (for example, file name) is set to the target field 32 of the generated entry, and the tier level of the storage in which data is currently stored is set to the tier level field 33. In the meantime, any values need not to be set to the operation field 34 and the priority field 35 of the generated entry. Note that entries corresponding to the data items (data files) stored in the tiered storage devices 19 may be generated in advance.

The movement, manager 53 relocates data among the tiered storage devices 19 using the tiering hint information 31. The movement manager 53 moves, for example, the data with high access frequency to the storage device 15 (SSD) from the storage device 16 (HDD) or the storage device 17 (tape storage device) based on the access frequency of the data indicated in the tiering hint information 31. The movement manager 53 also moves the data with lowered access frequency from the storage device 15 (SSD) to the storage device 16 (HDD) or the storage device 17 (tape storage device) based on the access frequency of the data indicated in the tiering hint information 31. In this manner, the data is relocated among the tiered storage devices 19.

More specifically, the movement manager 53 may determine to which tier each data should be relocated according to the access frequency. The determined tier may be referred to as a movement target tier. The movement manager 53 may rank the data in descending order of access frequency and may classify the data into the groups of high access frequency, middle access frequency and low access frequency based on the result of the ranking. The movement manager 53 may determine that data belonging to the group of the high access frequency should be placed on the tier-level 1. Further, the movement manager 53 may determine that data belonging to the group of the middle access frequency should be placed on the tier-level 2 and data belonging to the group of the low access frequency be placed on the tier-level 3.

Or, the movement manager 53 may determine that data with an access frequency higher than a first threshold should be placed on the tier-level 1, data with an access frequency lower or equal to the first threshold but higher than a second threshold be placed on the tier-level 2, and data with an access frequency lower or equal to the second threshold be placed on the tier-level 3.

When the movement target tier level differs from the tier level on which the data is currently placed, the movement manager 53 moves the data to the storage device associated with the movement target tier level.

The data are moved among the tier levels at a granularity of files. Naturally, the data may be moved at a granularity finer than the files.

An example of data movement based on the access frequency will be described later with reference to FIG. 10.

The tiering hint manager 52 updates the tiering hint information 31 based on the data placement in the tiered storage devices 19 after the data relocation described above. When, for example, the first data is placed in the storage device 15 and the second data is placed in the storage device In by the data relocation (data movement), the tiering hint manager 52 updates the tiering hint information 31 so as to include the information indicating that the first data is placed at the first tier level and the second data is placed at the second tier level. Thus, the updated tiering hint information 31 indicates the data placement in the tiered storage devices 19 after the data relocation. The tiering hint manager 52 transmits the updated tiering hint information 31 (first information) to the storage server 20 via the network interface 14 as a hint for the data relocation among the tiered storage devices 29 in the storage server 20.

The tiering hint manager 52 may transmit the tiering hint information 31 to the storage server 20 as it is, or may transmit the tiering hint information obtained by modifying (editing) the tiering hint information 31 before transmitting to the storage server 20. FIG. 7 shows an example of the modified tiering hint information 39 to be transmitted to the storage server 20 from the storage server 10. The tiering hint information 39 shown in FIG. 7 is obtained by deleting a field (here, the access frequency field) among those in each entry, which is not used by the storage server 20, from the tiering hint information 31.

The tiering hint manager 52 can carry out the following modification, for example, to the tiering hint information 31. Examples of the modification include:

setting the priority of each entry according to the access frequency of data;

extracting entries with higher importance (that is, entries which can make a higher effect by data relocation) among all the entries; and changing the operation to data according to the time period where the data remained in one tier (for example, setting "lock" to the operation field of the entry corresponding to the data which exists in a certain storage device for 24 hours or more).

The storage server 20 receives such tiering hint information 39 (or tiering hint information 31) from the storage server 10.

FIG. 8 shows a functional structure of the tiering manager 20A operating on the storage server 20.

The tiering manager 20A has a functional structure similar to that of the tiering manager 10A which operates on the storage server 10 described above, and comprises an I/O manager 61, a tiering hint manager 62 and a movement manager 63. These modules 61, 62 and 63 in the tiering manager 20A can operate in similar manners to those of the modules 51, 52 and 53 in the tiering manager 10A, to realize the automatic storage tiering function and the tiering hint information transfer function.

The tiering manager 20A further has a data relocation function. The data relocation function is a function for relocating data among the tiered storage devices 29 in the storage server 20 based on the tiering hint information 39 received, from the storage server 10.

The movement manager 63 receives the tiering hint information 39 (the first information) from the storage server 10 via the network interface 24. Then, the movement manager 63 relocates the data among the tiered storage devices 29 by moving the data among the tiered storage devices 29 based on the received tiering hint information 39. For example, when the tiering hint information 39 includes information (an entry) indicating that the first data is placed at the first tier level, and information (an entry) indicating that the second data is located at the second tier level, the movement manager 63 moves the third data corresponding to the first data (that is, the third data having the same data ID as the first data) to the storage device 25 (SSD) from the storage device 26 (HDD) or the storage device 27 (tape storage device), and moves the fourth data corresponding to the second data (that is, the fourth data having the same data ID as the second data) from the storage device 25 (SSD) to the storage device 26 (HDD) or the storage device 27 (tape storage device), thereby relocating the data among the tiered storage devices 29. The first data stored in the storage server 10 and the third data stored in the storage server 20 are, for example, the same data files. Further, the second data stored in the storage server 10 and the fourth data stored in the storage server 20 are, for example, the same data files.

More specifically, the movement manager 63 relocates data among the tiered storage devices 29 based on entries included in the tiering hint information 39. The movement manager 63 selects one of the entries included in the tiering hint information 39. When the priority is set to each entry, the movement manager 63 may select an entry in the order from a higher priority. An entry indicates the tier level at which, for example, a data item should be placed and the operation for the data item. The movement manager 63 relocates the corresponding data in the tiered storage devices 29 based on the selected entry. That is, for example, with regard to certain data, if the tier level indicated in the selected entry of the data differs from the tier level at which the data is currently placed, the movement manager 63 moves the data to the storage device corresponding to the tier level indicated in the selected entry. If the tier level indicated in the selected entry is the same as the tier level at which the data is currently placed, the movement manager 63 does not move the data.

If the tiering hint information 39 indicates that the first data should be "locked" to the first tier level, the movement manager 63 locks the third data corresponding to the first data, to the first tier level. If the tiering hint information. 39 indicates that the first data is cached in the cache area 38, the movement manager 63 caches the third data corresponding to the first data in the cache area 48.

An example of the data relocation based on the received tiering hint information 39 will be described later with reference to FIG. 11.

Note that the movement manager 63 may notify the storage server 10 via the network interface 24 that the data relocation among the tiered storage devices 29 based on the tiering hint information 39 has been completed.

Moreover, when, after the relocating data among the tiered storage devices 29 based on the tiering hint information 39, a read request is received from a client 30 via the network interface 24, the I/O manager 61 can read the data designated by the read request from the cache area 48 or the tiered storage devices 29, and transmit the read data to the client 30 via the network interface 24.

Next, FIG. 9 shows an example in which data designated by a read request is stored in the cache area 38 (DRAM cache) of the main memory 13 by the storage server 10. In the example shown in FIG. 9, data A, data B, data C and data D are stored in the storage device 16 (HDD) corresponding to the tier-level 2 and data B is stored in the storage device 17 (tape storage device) corresponding to the tier-level 3.

When a read request to get the data A is received from the client 30, the data A is read from the storage device 16 corresponding to the tier-level 2 and the read data A is stored in the cache area 38 of the main memory 13. As described above, when there is a free space to store the data in the cache area 38, the data is stored in the free space. On the other hand, when there is no free space to store the data in the cache area 38, the data is stored, for example, in a space dedicated by invalidating data according to the LRU scheme.

As shown in FIG. 9, a copy of the data A stored in the storage device 16 is stored (cached) in the cache area 38. That is, while the data A is stored in the storage device 16, the copy of the data A is stored also in the cache area 38.

Figure 10:
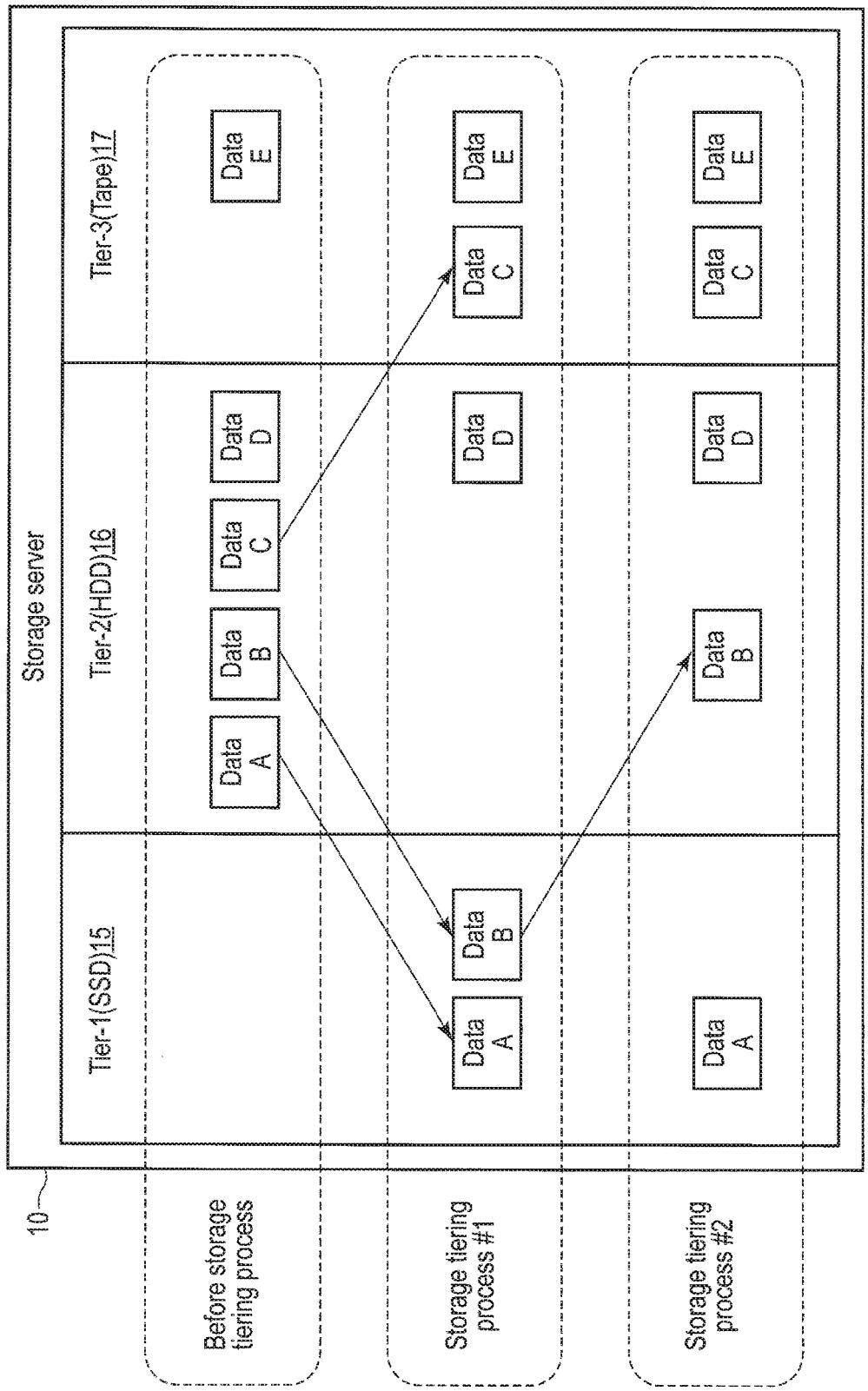
FIG. 10 is a diagram showing an example in which data is moved among tiered storages by the storage server of FIG. 2 based on access frequency.

FIG. 10 shows an example of movement of data among the tiered storage devices 19 based on the access frequency. Here, it is assumed that before executing a storage tiering processing, the data A, data B, data C and data D are placed in the storage device 16 (HDD) corresponding to the tier-level 2, and the data E is placed in the storage device 17 (tape storage device) corresponding to the tier-level 3.

The first storage tiering processing is executed using the tiering hint information 31 generated and updated by the storage server 10 based on read requests, etc., received within a first learning period (for example, 24 hours or 1 hour), for example.

As shown in FIG. 10, in the first storage tiering processing, the data A and data B, which have high access frequencies are moved to the storage device 15 (SSD) corresponding to the tier-level 1 from the storage device 16 corresponding to the tier-level 2. The data D with a middle access frequency is kept remain in the storage device 16 corresponding to the tier-level 2 without being moved therefrom. The data C with a low access frequency is moved to the storage device 17 corresponding to the tier-level 3 from the storage device 16 corresponding to the tier-level 2. Further, the data E with a low access frequency is kept remain in the storage device 17 corresponding to the tier-level 3 without being moved therefrom.

The tiering hint information 31 is updated based on the movement of the data by the first storage tiering processing described above. The updated tiering hint information 31 may include:

an entry indicating the movement of the data A to the tier-level 1 (Target=data ID#A, Tier level=1, Operation="prefetch");

an entry indicating the movement of the data B to the tier-level 1 (Target=data ID#B, Tier level=1, Operation="prefetch");

an entry indicating the movement of the data C to the tier-level 3 (Target=data ID™C, Tier level=3, Operation="invalidate");

an entry indicating the data D being in the tier-level 2 (Target=data ID#D, Tier level=2, Operation=none); and an entry indicating the data E being in the tier-level 3 (Target=data ID#E, Tier level=3, Operation=none).

After the first storage tiering processing is executed, the value set in the access frequency field of each entry may be reset (that is, 0 may be set to the access frequency field). When the storage server 10 receives a further read request from the client 30, the access frequency corresponding to the data designated by this read request is updated.

The second storage tiering processing is executed using the tiering hint information 31 generated and updated based on read requests, etc., received within the following learning period. In the second storage tiering processing, the data A with a high access frequency is kept remain in the storage device 15 corresponding to the tier-level 1 without being moved therefrom. The data B with a lowered access frequency is moved to the storage device 16 corresponding to the tier-level 2 from the storage device 15 corresponding to the tier-level 1. The data D with a middle access frequency is kept remain in the storage device 16 corresponding to the tier-level 2 without being moved therefrom. Further, the data C and data E with low access frequencies are kept remain in the storage device 17 corresponding to the tier-level 3 without being moved therefrom.

The tiering hint information 31 is updated based on the movement of the data by the second storage tiering processing described above. The updated tiering hint information 31 may include:

an entry indicating the movement of the data A to the tier-level 1 (Target=data ID#A, Tier level=1, Operation="prefetch");

an entry indicating the data being in the tier-level 2 (Target=data ID™B, Tier level=2, Operation=none);

an entry indicating the movement of the data C to the tier-level 3 (Target=data ID#C, Tier level=3, Operation="invalidate");

an entry indicating the data D being in the tier-level 2 (Target=data ID#D, Tier level=2, Operation=none); and an entry indicating the data E being in the tier-level 3 (Target=data ID#E, Tier level=3, Operation=none).

Note that, for example, if the access frequency of the data A placed at the tier-level 1 is especially high or the data A remains at the tier-level 1 for a threshold time or longer, the data A may be locked at the tier-level 1. In that case, the tiering hint information 31 may be updated to include an entry indicating that the data A is to be moved to the tier-level 1 with the designation of "lock" (target=data 1D#A, tier level=1, operation="prefetch", "lock"). In addition, when, for example, the access frequency of the data E placed at the tier-level 3 is especially low or the data E remains at the tier-level 3 for a threshold time or longer, the data E may be locked at the tier-level 3. In this case, the tiering hint information 31 may be updated to include an entry indicating that the data E is "locked" to the tier-level 3 (target=data ID™E, tier level=3, operation="lock").

Figure 11:
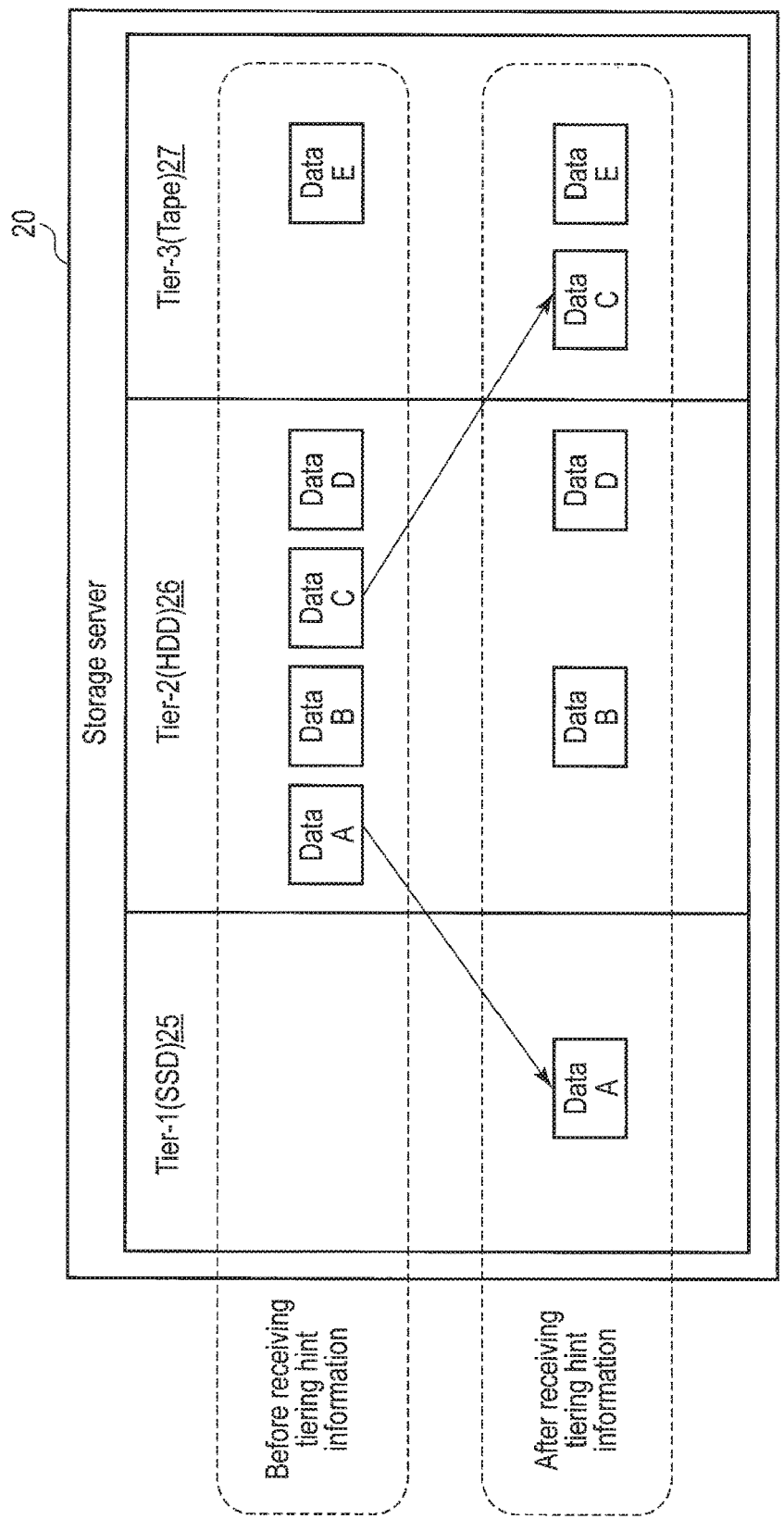
FIG. 11 is a diagram showing an example in which data is moved among tiered storages by the storage server of FIG. 3, based on the tiering hint information.

Next, FIG. 11 shows an example of the processing that the tiering hint information 31 updated by the second storage tiering processing is transmitted to the storage server 20 from the storage server 10, and the data is moved among the tiered storage devices 29 in the storage server 20 using the tiering hint information 31. The example illustrates such a case where, at a time before receiving the tiering hint information 31, the data A, data B, data C and data D are placed in the storage device 26 (HDD) corresponding to the tier-level 2, and the data E is placed at the storage device 27 (tape storage device) corresponding to the tier-level 3 (that is, the case of the same data placement as that before the storage tiering process shown in FIG. 10).

In the storage server 20, data is moved among the tiered storage devices 29 based on each entry included in the received tiering hint information 31. More specifically, based on the entry indicating that the data A is to be moved to the tier-level 1, the data A stored in the storage device 26 corresponding to the tier-level 2 is moved to the storage device 25 (SSD) corresponding to the tier-level 1. Based on the entry indicating that the data C is to be moved to the tier-level 3, the data C stored in the storage device 26 corresponding to the tier-level 2 is moved to the storage device 27 corresponding to the tier-level 3. Moreover, as to the data B, data D and data E, since the tier levels in which these data are currently stored are respectively the same as the tier levels shown in the respective entries associated with the data, they are not moved.

Note that if the received tiering hint information 31 includes an entry indicating that the data A is to be moved to the tier-level 1 with the Operation of "lock", the data A moved to the storage device 25 corresponding to the tier-level 1 is locked. In addition, if the received tiering hint information 31 includes an entry indicating that the data B is to be "locked" to the tier-level 3, the data E placed at the storage device 27 corresponding to the tier-level 3 is locked.

As described above, the storage server 20 relocates data among the tiered storage devices 29 in the storage server 20 based on the tiering hint information 31 received from the storage server 10. Therefore, the data relocation in the respective tiered storage devices 29 of the storage server 20 can be synchronized with the latest data placement of the tiered storage devices 19 of the storage server 10. Thus, the current data placement in the tiered storage devices 19 of the storage server 10 can be duplicated in the tiered storage devices 29 of the storage server 20.

If the received tiering hint information 31 also includes additional information indicating data being present in the cache area 38 (DRAM cache), the storage server 20 prefetches the data in the cache area 48 (DRAM cache) in the storage server 20. Thus, the contents of the cache area 48 (DRAM cache) of the storage server 20 can be synchronized with the latest contents of the cache area 38 (DRAM cache) of the storage server 10.

Figure 12:
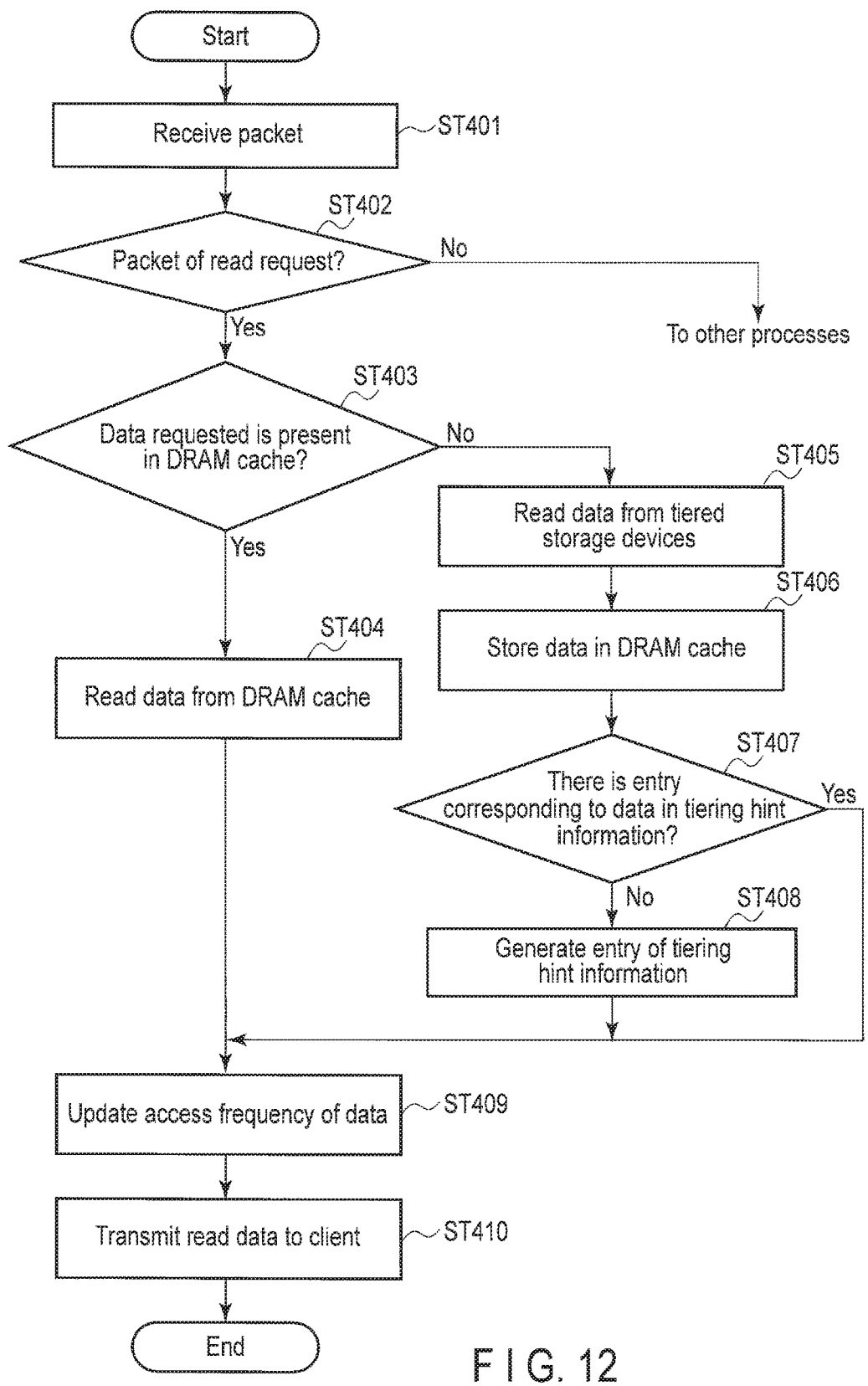
FIG. 12 is a flowchart showing an example of the procedure of processing executed by a processor (CPU) in the storage server of FIG. 2, when a read request is received from a client.

Next, an example of the procedure of the processing executed by the CPU (processor) 11 of the storage server 10 when a read request is received from a client 30 will now be described with reference to the flowchart of FIG. 12.

First, the CPU 11 receives a packet from the client 30 via the network interface 14 (step ST401). Then, the CPU 11 determines whether the received packet is a packet including a read request (step ST402). If the received packet is not a packet including a read request (No in step ST402), other processes according to the contents of the packet are executed.

When the received packet is a packet including a read request (Yes in step ST402), the CPU 11 determines whether the data designated by the read request is present in the DRAM cache (the cache area 38 of the main memory 13) (step ST403). If the data designated by the read request is present in the DRAM cache (Yes in step ST403), the CPU 11 reads the data from the DRAM cache (step ST404).

If the data designated by the read request is not present in the DRAM cache (No in step ST403), the CPU 11 reads the data from the tiered storage devices 19 (step ST405) and stores the read data in the DRAM cache (step ST406). Here, when there is a free space in the DRAM cache, which can store the read data, the CPU 11 stores the data in the free space. On the other hand, if there is no free space in the DRAM cache, which can store the read data, the CPU 11 stores the data in a space allocated in the DRAM cache by evicting data according to the LRU scheme, for example. Then, the CPU 11 determines whether the tiering hint information 31 includes an entry corresponding to the read data (step ST407). If there is no entry corresponding to the read data (No in step ST407), the CPU 11 generates an entry of the tiering hint information 31 (step ST408). If there is an entry corresponding to the read data (Yes in step ST407), the procedure of step ST408 is skipped.

Subsequently, the CPU 11 updates the access frequency of the data read from the DRAM cache or the tiered storage devices 19 (step S409). The CPU 11 increments the access frequency of the entry corresponding to the data by one, for example. Then, the CPU 11 transmits the read data to the client 30 (step ST410).

Figure 13:
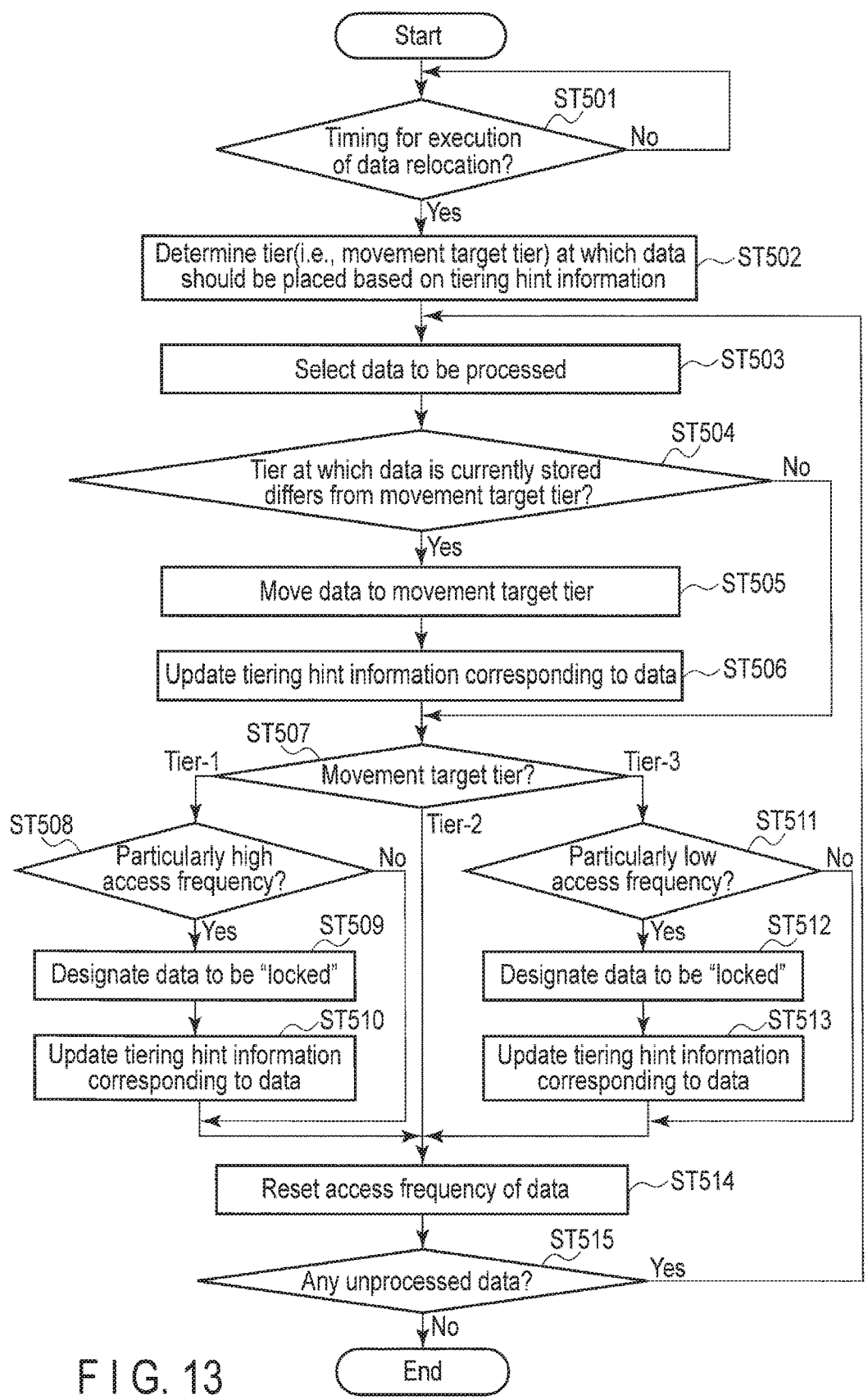
FIG. 13 is a flowchart showing an example of the procedure of a storage tiering process executed by the processor (CPU) in the storage server of FIG. 2.

The flowchart of FIG. 13 shows an example of the procedure of the storage tiering process executed by the CPU 11 of the storage server 10.

First, the CPU 11 determines whether the time has come for the data relocation execution for automatic storage tiering (step ST501). The process of the data relocation for automatic storage tiering may be executed periodically, for example, for every 24 hours or 1 hour.

When the data relocation execution timing has come (Yes in step ST501), the CPU 11 determines the tier (storage device) at which the respective data (for example, a respective file) should be placed (i.e., movement target tier) based on the access frequency of the tiering hint information 31 (step ST502). In this case, the CPU 11 determines, based on the access frequency contained in each entry of the tiering hint information 31, that data with high access frequency should be placed at the first tier level (tier-level 1), data with middle access frequency should be placed at the second tier level (tier-level 2) and data with low access frequency should be placed at the third tier level (tier-level 3).

Subsequently, the CPU 11 selects target data (i.e., data to be processed) from those corresponding to the entries of the tiering hint information 31 (step ST503). Then, the CPU 11 determines whether the tier at which the target data is currently stored (i.e., current tier) differs from the tier (movement target tier) determined by step ST502 that the data should be placed at (step ST504). If the current tier differs from the movement target tier (Yes in step ST504), the CPU 11 moves the target data from the storage device corresponding to the current tier to the storage device corresponding to the movement target tier (step ST505). Then, the CPU 11 updates the entry corresponding to the target data in the tiering hint information 31 (step ST506). The updated entry indicates that the target data is placed in the movement target tier.

If the current tier and the movement target tier are the same (No in step S504), the target data does not need to be moved and therefore the procedures of step ST505 and step ST506 are skipped.

Subsequently, the CPU 11 executes a procedure branched off based on the movement target tier (step ST507). If the movement target tier is the first tier level (Tier-1 in step ST507), the CPU 11 determines whether the target data is data having a particularly high access frequency (step ST508). If the access frequency is higher than a threshold value, the CPU 11 determines that the target data is data having a particularly high access frequency. Alternatively, the CPU 11 may determine that the target data is data having particularly high access frequency if the target data is ranked within the range from the top to a threshold rank in the descending order of access frequency.

If the target data is data having a particularly high access frequency (Yes in step ST508), the CPU 11 designates the target data to be locked (step ST509). More specifically, the CPU 11 designates the target data to be locked in the storage device. Then, the CPU 11 updates the entry corresponding to the target data in the tiering hint information 31 (step ST510). For example, the CPU 11 sets (adds) "lock" to the operation field of the entry corresponding to the target data.

If the target data is not data having a particularly high access frequency (No in step ST508), the procedures of steps ST509 and ST510 are skipped.

If the movement target tier is the second tier level (Tier-2 in step ST507), the operation proceeds to step ST514.

If the movement target tier is the third tier level (Tier-3 in step ST507), the CPU 11 determines whether the target data is data having a particularly low access frequency (step S511). If the access frequency is lower than a threshold value, the CPU 11 determines that the target data is data having a particularly low access frequency. Alternatively, the CPU 11 may determine that the target data is data having particularly low access frequency if the target data is ranked within the range from the bottom to a threshold rank in the descending order of access frequency.

If the target data is data having a particularly low access frequency (Yes in step ST511), the CPU 11 designates the data to be locked (step ST512). Then, the CPU 11 updates the entry corresponding to the target data in the tiering hint information 31 (step ST513). For example, the CPU 11 sets (adds) "lock" to the operation field of the entry corresponding to the target data.

If the target data is not data having a particularly low access frequency (No in step ST511), the procedures of steps ST512 and ST513 are skipped.

After executing the procedure for the movement target tier, the CPU 11 resets the access frequency of the target data (step ST514). That is, the CPU 11 sets 0 to the access frequency field of the entry corresponding to the target data.

Then, the CPU 11 determines whether the data corresponding to the entries of the tiering hint information 31 contains unprocessed data (step ST515). If there is unprocessed data (Yes in step ST515), the operation returns to step ST503, where the procedure is executed on the unprocessed data as new target data. The processing is ended if there is no unprocessed data (No in step ST515).

Subsequently, an example of the procedure of the hint transfer process executed by the CPU 11 of the storage server 10 will be described with reference to the flowchart of FIG. 14.

First, the CPU 11 determines whether the time has come to transfer tiering hint information. (step ST61). When the CPU 11 may determine that the transfer timing of tiering hint information has come, for example, in the following occasions:

(1) when a tiering hint information transfer request is received from the management server 40;

(2) when the storage server to accept read requests from the client 30 is switched to the storage server 20 from the storage server 10;

(3) when the scheduled date and time to transmit the tiering hint information designated by the schedule data received from the management server 40 has come;

(4) when a failure, which is occurred in a part of the storage server 10, is detected; and (5) when software is added to the storage server 10.

Alternatively, the data placement among the tiered storage devices 29 of the storage server 20 may be synchronized at all times with the data placement of the tiered storage devices 19 of the storage server 10 regardless of the timing for switching the storage server to accept read requests. In this case, the CPU 11 may transmit the tiering hint information periodically to the storage server 20.

When the timing for transferring the tiering hint information has come (Yes in step ST61), the CPU 11 generates the tiering hint information 39 described with reference to FIG. 7 by modifying the tiering hint information 31 (step ST62). In order to designate, for example, data which exists in a certain storage device for 24 hours or longer, to be "locked", the CPU 11 sets (adds) "lock" to the operation field of the entry corresponding to this data. Moreover, the CPU 11 may extract only important entries (hints) from the entries included in the tiering hint information 31. Furthermore, the CPU 11 may set a value indicating the priority such as "high", "medium" or "low" to the priority field of each entry of the tiering hint information 31.

The CPU 11 transmits the modified tiering hint information 39 to the storage server 20 via the network interface 14 (step ST63). Note that the tiering hint information 31 may be transmitted to the storage server 20 as it is, without being modified.

Figure 15:
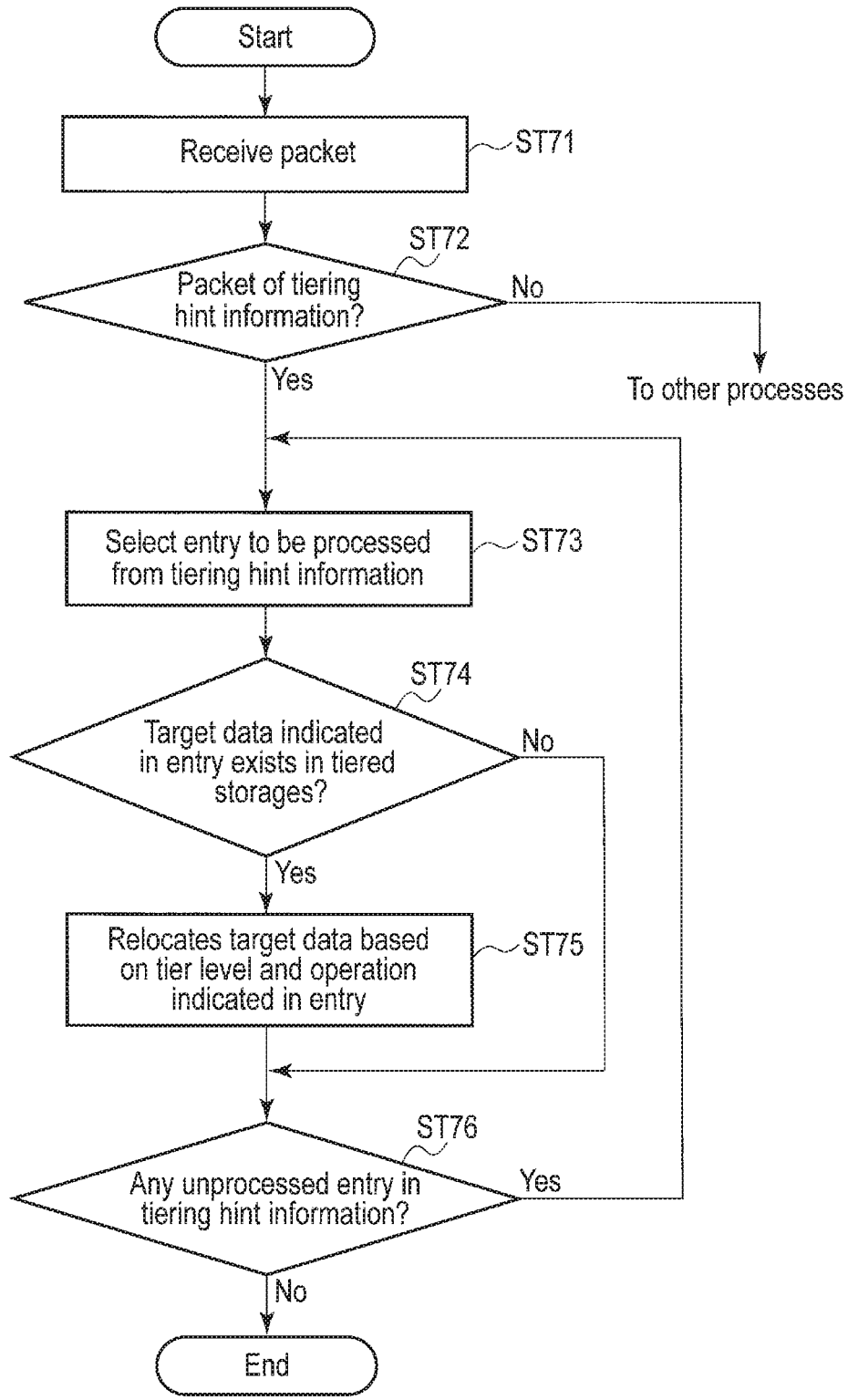
FIG. 15 is a flowchart showing an example of the procedure of a data relocation process executed by a processor (CPU) in the storage server of FIG. 3.

The flowchart of FIG. 15 shows an example of the procedure of the data relocation process executed by the CPU 21 of the storage server 20.

First, the CPU 21 receives a packet from the storage server 10 via the network interface 24 (step ST71). Then, the CPU 21 determines whether the received packet is a packet including the tiering hint information 39 (or tiering hint information 31) (step ST72). If the received packet is not a packet including the tiering hint information 39 (No in step ST72), other processes according to the contents of the packet are executed.

If the received packet is a packet including the tiering hint information 39 (Yes in step ST72), the CPU 21 selects a target entry (i.e., an entry to be processed) from the tiering hint information 39 (step ST73). The tiering hint information 39 includes at least one entry.

Subsequently, the CPU 21 determines whether target data indicated in the target entry exists in the tiered storages 29 (step ST74). If the target data exists in the tiered storages 29 (Yes in step ST74), the CPU 21 relocates the target data based on the tier level and operation indicated. In the target entry (step ST75). If the tier level indicated in the target entry differs from the tier level at which the target data is currently placed, the CPU 21 moves the target data to the storage device corresponding to the tier level indicated in the target entry. If the tier level at which the target data is currently placed is the same as the tier level indicated in the target entry, the CPU 21 does not move the target data.

If the target data does not exist in the tiered storage devices 29 (No in step ST74), the procedure of step ST75 is skipped.

Subsequently, the CPU 21 determines whether there is an unprocessed entry in the received tiering hint information 39 (step ST76). If there is an unprocessed entry (Yes in step ST76), the operation returns to step ST73 and the procedure is executed on the unprocessed entry as a new target entry. If there is no unprocessed entry (No in step ST76), i.e., if the processes based on all the entries in the tiering hint information 39 are completed, the processing is ended.

As described above, in this embodiment, when the CPU 11 receives a read request from a client 30 via the network interface 14, the CPU 11 reads the data designated by the read request from the tiered storage devices 19, and transmits the read data to the client 30 via the network interface 14. The CPU 11 moves the data of the first access frequency from the second storage device (for example, the storage device 16) to the first storage device (for example, the storage device 15), and also moves the data of the second access frequency, which is lower than the first access frequency, from the first storage device to the second storage device. Thus, the data is relocated among the tiered storage devices 19. Then, the CPU 11 transmits the tiering hint information (the first information) indicating the location of the data in the tiered storage devices 19 after the relocation of the data to the storage server 20 via the network interface 14, as a hint for the data relocation among the tiered storage devices 29 in the storage server 20. The storage server 20 relocates the data among the tiered storage devices 29 used on the tiering hint information received from the storage server 10. Thus, the data placement in the tiered storage devices 19 of the storage server 10, which has already been optimized by the learning based on the read requests can be reflected in the data placement in the tiered storage devices 29 of the storage server 20. With this operation, the storage server 20 can respond quickly to read requests from the clients 30 even from the time immediately after starting the read-only services, for example.

Second Embodiment

Figure 16:
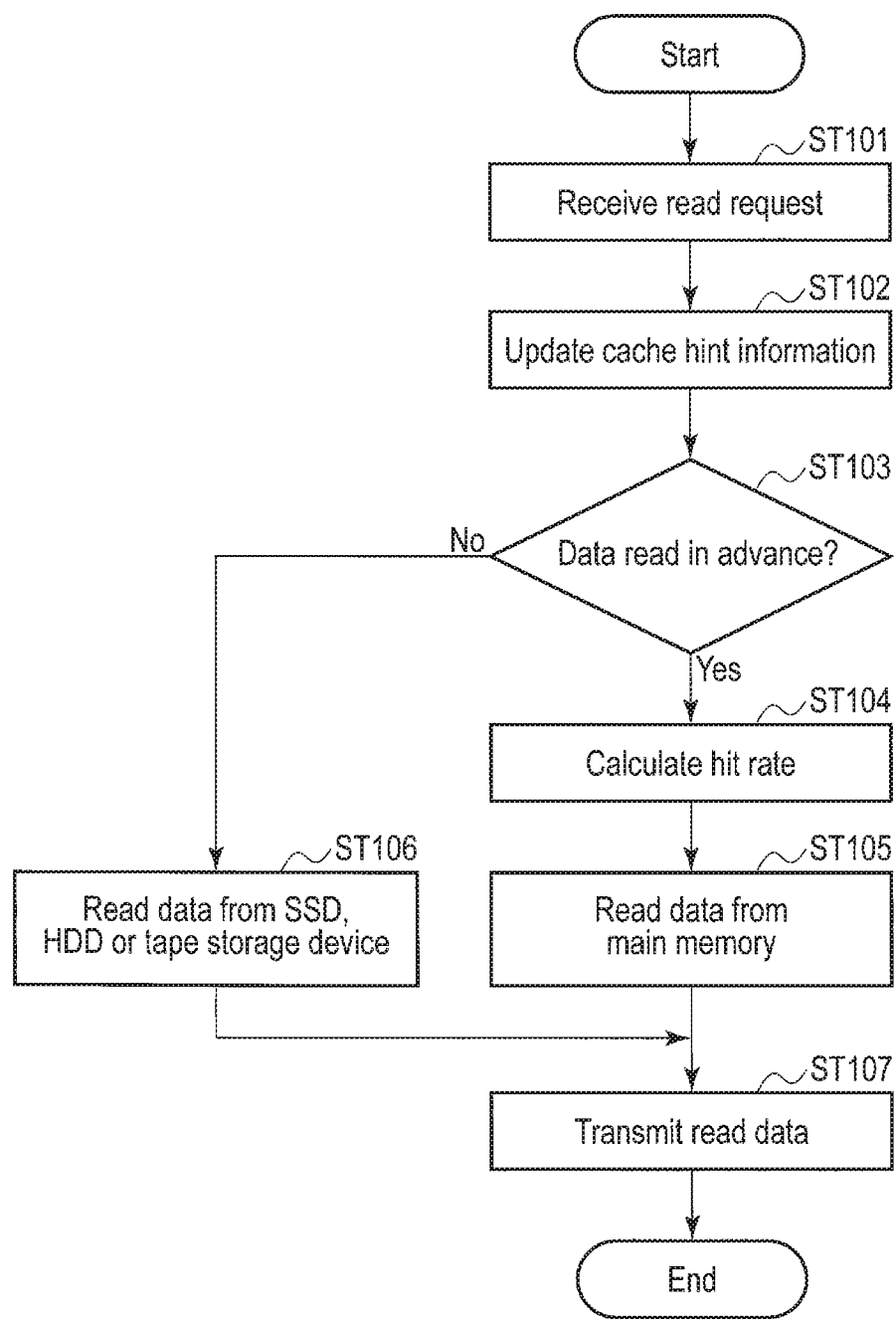
FIG. 16 is a flowchart showing an example of another procedure of the processing executed by the processor (CPU) in the storage server of FIG. 2, when a read request is received from a client.

Next, another example of the processing executed by the storage server 10 will now be described as the second embodiment. FIG. 16 is a flowchart showing another example of the processing executed by the CPU 11 when a read request is received.

As shown in FIG. 16, when the CPU 11 receives a read request via the network 50 (network interface 14) from a client (information processing apparatus) 30 (step ST101), the CPU 11 updates the cache hint information (tiering hint information) 31 (step ST102). In details, the CPU 11 stores a new hint including a target 32, a tier level 33 and an operation 34 based on the read request. Note that a read request includes not only information indicating the target (data ID) of the cache hint information 31, but also other information. The other information may be, for example, information specifying the storage server 10.

Next, the CPU 11 determines whether the target data is read in advance into the main memory 13 based on the read request (step ST103). For example, the CPU 11 determines whether the target data is read into the main memory 13 by referring to a list of the data read into the main memory 13. Here, the list may be stored in the main memory 13 or in the CPU 11, that is, the location of the storage of the list can be arbitrarily set.

If it is determined that the target data is read in advance into the main memory 13 (Yes in step ST103), the CPU 11 calculates a "hit rate" 36 for the hint (step ST104), and reads the target data from the main memory 13 (step ST105).

On the other hand, if determined that the target data is not read in advance into the main memory 13 (No in step ST103), the CPU 11 reads the target data from the SSD 15, the HDD 16 or the tape storage device 17 (step ST106).

The CPU 11 transmits the data read from the main memory 13 in step ST105, or the data read from the SSD 15, the HDD 16 or the tape storage device 17 in step ST106, to the client 30 via the network 50 (step ST107). Thus, the storage server 10 can provide the data designated by the read request to the client 30.

Next, the timing that the management server 40 transmits a hint transfer request to the storage server 10 will be explained.

Here, a hint transfer request is, in the present embodiment, a request which instructs to transmit the cache hint information 31 saved in the storage server 10 to the storage server 20 from the storage server 10.

The management server 40 may manage the storage server 10 and the storage server 20 as described above. The management server 40 transmits the hint transfer request to the storage server 10 if it is detected that a failure occurred in a part of the storage server 10 (that is, for example, a sign of failure of a certain storage device in the storage server 10).

Figure 17:
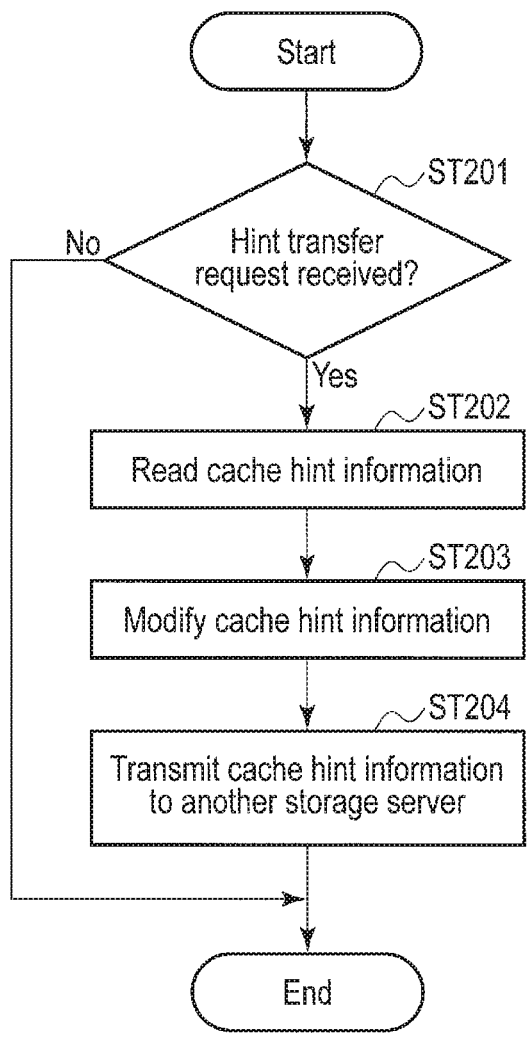
FIG. 17 is a flowchart showing an example of another procedure of the hint transfer process executed by the processor (CPU) in the storage server of FIG. 2.

FIG. 17 is a flowchart showing another example of the process executed by the CPU 11 when the storage server 10 receives a hint transfer request from the management server 40 via the network 50.

As shown in FIG. 17, the CPU 11 determines whether the hint transfer request is received from the management server 40 (step ST201). If it is determined that the hint transfer request is not received (No in step ST201), the processing is ended.

If it is determined that the hint transfer request has been received (Yes in step ST201), the CPU 11 reads the cache hint information 31 from the cache 12 (step ST202). Note that in this embodiment, a priority set in the priority field 35 is added to the cache hint information 31.

Subsequently, the CPU 11 modifies the read cache hint information 31 (step ST203).

Here, the modification is to change the contents of the cache hint information 31 according to a predefined (preset) policy or a specific algorithm.

More specifically, for example, the CPU 11 extracts hints from all the hints (entries) included in the cache hint information 31 based on the predefined policy or specific algorithm, and then generates cache hint information 31' from the extracted hints. Note that the thus modified cache hint information 31' includes information of a target 32', a tier level 33' and an operation 34'.

An example of the process using the predefined policy is as follows. That is, with a hint corresponding to data existing at the first tier level (tier-level 1) for 24 hours or longer, the CPU 11 changes the content of the "operation" 34 to prefetch with a lock designation. On the other hand, with a hint corresponding to data existing at the first tier level (tier-level 1) for less than 24 hours, the CPU 11 changes the contents of the "operation" 34 to "prefetch".

Furthermore, an example of the processing using a specific algorithm is that the CPU 11 executes processing to extract a part of the cache hint information 31. More specifically, the CPU 11 extracts hints each having the hit rate of a first threshold value or signer, from all the hints included in the cache hint information 31 based on the hit rate 36, and generates cache hint information 31' from the extracted hints. Note that, this embodiment is described for the case where the hit count information is used as the hit rate, but the hit count within unit time (for example, 24 hours) may be used in place of the hit rate.

In this embodiment, examples of the processes using the predefined policy and specific algorithm are described above. It is also possible to set up arbitrarily whether the contents of the cache hint information 31 should be changed according to the predefined policy or the specific algorithm. Moreover, the example of the processing using the predefined policy may be realized as processing using a specific algorithm, or the example of the processing using the specific algorithm may be realized as processing using a predefined policy.

Moreover, this embodiment exemplifies a case where the aforementioned modification is carried out on the cache hint information 31 read in step ST202, but it not limited to this. It may be arranged that the CPU 11 does not modify the read cache hint information 31. Further, it may be arranged that information (modification setting information) instructing whether to modify the cache hint information 31 is included in the hint transfer request received from the management server 40, and the CPU 11 determines whether the cache hint information 31 should be modified based on the information.

Subsequently, the CPU 11 transmits the modified cache hint information 31' to the storage server 20 via the network 50 (step ST204). The cache hint information 31' is transmitted, for example, by packets to the storage server 20 from the storage server 10.

Next, the processing by the storage server 20 will be described. FIG. 18 is a flowchart showing another example of the processing executed by the CPU 21 when the storage server 20 receives the cache hint information 31' from the storage server 10.

As shown in FIG. 18, the CPU 21 determines whether the cache hint information 31' is received from the storage server 10 (step ST301). If it is determined that the cache hint information 31' is not received. (No in step ST1301), the processing returns to step ST301.

If it is determined that the cache hint information 31' has been received (Yes in step ST301), the CPU 21 determines whether the target 32' included in the received cache hint information 31' exists (step ST302). In more details, the CPU 21 determines whether the target 32' of one arbitrary hint included in the received cache hint information 31' exists in a target 42 it cache hint information 41 stored in the SSD 25.

If the CPU 21 determines the existence (Yes in step ST302), it further determines whether the information on the target 32' included in the cache hint information 31' (the tier level 33' and operation 34') is the same as the information on the target 42 (the tier level 43 and operation 44) (step ST303).

If the information are determined to be the same (Yes in step ST303), the CPU 21 stores the arbitrary hint of the received cache hint information 31', in the SSD 25 (step ST304).

If the information are determined to be not the same (No in step ST303), the CPU 21 executes the data relocation (data movement) according to the information on the target 32' (the tier level 33' and operation 34'), and thereafter stores the information of the arbitrary hint (the target 32', tier level 33' and operation 34') of the received cache hint information 31' in the SSD 25 (step ST305). Note that the details of the data movement process will be described later with reference to FIG. 19.

When the information on the arbitrary hint of the cache hint information. 31' is stored in the SSD 25 (step ST304, ST305), the CPU 21 determines whether the storage of all the hints included in the received cache hint information 31' to the SSD 25 is completed. (step ST306).

If determined that there is a hint which is not yet stored (No in step ST306), the processing returns to step ST302. If the CPU 21 determines that all the hints have been stored (Yes in step ST306), the processing is ended.

Figure 19:
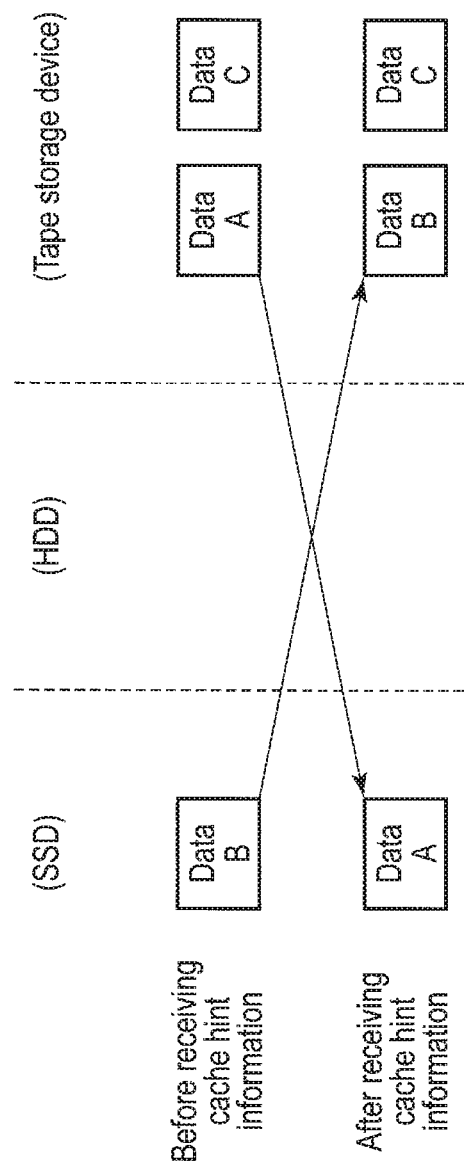
FIG. 19 is a diagram showing another example in which data is moved among tiered storages in the storage server of FIG. 3, based on the tiering hint information.

Next, the data relocation (data movement) in step ST305 will be described. FIG. 19 is a schematic diagram illustrating an example of the data relocation (data movement) executed by the CPU 21 when the storage server 20 receives the cache hint information 31'.

As shown in FIG. 19, in the storage server 20, before receiving the cache hint information 31', data A and data C are stored in the tape storage device 27 and data B is stored in the SSD 25. Here, it is assumed that hints corresponding to these data are stored as the cache hint information 41 in the SSD 25.

More specifically, the hint for the data A indicates that: the target 42 is the data A; the tier level 43 is the tier-level 3; and the operation 44 is "lock". The hint for the data B indicates that: the target 42 is the data B; the tier level 43 is the tier level 1; and the operation 44 is "prefetch". The hint for the data C indicates that: the target 42 is the data C; the tier level 43 is the tier-level 3; and the operation 44 is "lock".

Here, it is further assumed a case in which the storage server 20 receives the cache hint information 31' from the storage server 10 and this received cache hint information 31' includes three hints.

The first hint indicates that: the target 32' is the data A; the tier level 33' is the tier-level 1; and the operation 34' is "prefetch". The second hint indicates that: the target 32' is the data B; the tier level 33' is the tier-level 3; and the operation 34' is "WB invalidate". The third hint indicates that: the target 32' is the data C; the tier level 33' is the tier-level 3; and the operation 34' is "lock".

The CPU 21 moves the data A, data B and data C based on each hint in the received cache hint information 31' as follows.

As to the data A:

For the hint that indicates the target 42 is the data A, the CPU 21 changes the tier level 43 of the hint from the tier-level 3 to the tier-level 1 and moves the data A from the tape storage device 27 to the SSD 25. Further, the CPU 21 changes the operation 44 of the hint from "lock" to "prefetch". Thus, the data A is read into the main memory 23 (cache area 48).

As to the data B:

For the hint that indicates the target 42 is the data B, the CPU 21 changes the tier level 43 of the hint from the tier-level 1 to the tier-level 3 and moves the data B from the SSD 25 to the tape storage device 27. Further, the CPU 21 changes the operation 44 of the hint from "prefetch" to "WB invalidate". Thus, the data B is erased from the main memory 23 (cache area 48).

As to the data C:

Since the hint that indicates the target 42 is the data C and the third hint indicate the same information, the CPU 21 stores the received third hint in the SSD 25 without moving the data C.

The data relocation process, etc. are executed as described above.

According to the storage system 1 constituted as described above, if a failure occurs in a part of the storage server 10 (that is, for example, if a sign of failure of a certain storage device in the storage server 10 is detected), the cache hint information 31' stored in the SSD 15 (or the main memory 13) can be transmitted to the storage server 20 (another storage server) which stores data corresponding to those stored in the tiered storage devices 19 (SSD 15, HDD 16 and tape storage device 17) via the network interface 14.

Then, when the storage server 20 receives the cache hint information 31' via the network interface 24, it updates the cache hint information 41 stored in the SSD 25 based on the received cache hint information 31'. Then, the storage server 20 reads data into the main memory 23 from the SSD 25, HDD 26 and tape storage device 27 using the updated cache hint information. 41 stored in the SSD 25. That is, the storage server 20 can use the cache hint information 31' received from the storage server 10 as its own cache hint information 41.

Therefore, when the storage server 20 receives a read request from a client 30, it can transmit data to the client 30 at the same response speed as that of the storage server 10. In other words, according to the storage system 1, even if the source of data to be provided to a client 30 is switched from the storage server 10 to the storage server 20, delay in access can be prevented.

The above-provided embodiments are exemplified in connection with a case where the cache hint information 31' is transmitted from the storage server 10 to the storage server 20, but it is also possible to execute a similar process with regard to the case where cache hint, information 41 or modified cache hint information 41' is transmitted from the storage server 20 to the storage server 10. That is, the storage server 10 and the storage server 20 can each execute processing for receiving cache hint information as well as for transmitting cache hint information.

(Modification)

A modification of the above-provided embodiments will be described.

The above-provided embodiments are described in connection with the case where the backup of data stored in the storage server 10 is executed in the storage server 20, but the embodiments are not limited to such a configuration. For example, multiple storage servers may be provided in the storage system 1 to execute the backup of the data stored in a storage server by all of these storage servers. Furthermore, a part of the data stored in the storage server 10 may be backed up in the other storage servers.

With such a configuration where backup is executed by multiple storage servers to be able to provide the same data to clients 30 by these storage servers, when transmitting cache hint information 31' from one storage server 10 to the other storage servers, the management server 40 may reconstruct the cache hint information 31'. Then, the management server 40 may transmit the reconstructed cache hint, information 31' to the other storage servers.

In more details, for example, if the management server 40 detects the occurrence of a failure in a part of the storage server 10, the management server 40 transmits a hint transfer request to transmit cache hint information 31' to the management server 40, to the other storage servers by multicasting. Then, the management server 40 reconstructs cache hint information 31' using the cache hint information 31' received from each of the other storage servers. Subsequently, the management server 40 transmits the reconstructed cache hint information 31' to the storage servers other than that which detected the failure.

Thus, the other storage servers can read data in advance into their main memories based on the cache hint information 31' reconstructed by using the cache hint information 31' of many storage servers.

Here, the reconstruction is defined as, for example, to reconstruct cache hint information using all the cache hint information 31'. A more specific example of the reconstruction includes such a process that:

if data has a hit count within unit time larger than a threshold value, the tier level 33 of the data is set to the tier-level 1 and the operation 34 for the data is changed to "prefetch"; and if data has a hit count within unit time smaller than or equal to the threshold value, the tier level 33 of the data is set to the tier-level 3 and the operation 34 for the data is set to "lock".

Moreover, the above-provided embodiments are described in connection with the case where the cache hint information 31 and 41 stored in the storage servers 10 and 20 are hints (the targets 32 and 42, tier levels 33 and 43, operations 34 and 44) related to read requests, but they are not limited to this. Not all of these elements are required, or other elements may be incorporated. Further, hints may be related to other requests including a write request.

Furthermore, the above-provided embodiments are described in connection with the case where if the management server 40 detects a failure in a part of the storage server 10, the storage server 10 receives a hint transfer request from the management server 40, and transmits the cache hint information 31 to the storage server 20, but they are not limited to this.

For example, it may be rearranged that if the management server 40 detects the addition (reinforcement) of a storage server to the storage system 1, the management server 40 transmits a hint transfer request to the storage server 10 and the storage server 10 transmits cache hint information 31' to the storage server added (reinforced). Thus, as to the added storage server as well, read-only service can be provided for a client 30 at the same response speed as that of the storage server 10.

It may be also arranged that not only when adding (reinforcing) a storage server to the storage system 1, but also when adding new software to the storage server 10, the management server 40 transmits a hint transfer request to the storage server 10.

For example, if new software is installed in the storage server 10 and the storage server provides new service to clients 30, a hint regarding the assumption data of which the hit rate is presumed to be high may be stored in the cache 12 as the cache hint information 31. As its method, for example, a hint for the above-described assumption data may be included in the hint transfer request, and the CPU 11, which received the hint transfer request, stores the hint in the SSD 15 as the cache hint information 31.

Further, a hint regarding such data (resources) that may cause harmful effects if the response becomes slow by installing the software in the storage server 10 may be stored in the SSD 15 as the cache hint information 31. In addition, this type of hint should desirably designate the operation 34 to be "locked".

Moreover, the above-provided embodiments are exemplified in connection with a case where if the storage server 10 receives a hint transfer request from the management server 40, the cache hint information 31' is transmitted to the storage server 20, but the timing that the storage server 10 outputs the cache hint information 31' (or cache hint information 31) is not limited to this.

For example, the cache hint information 31' of the storage server 10 may be synchronized with the cache hint information 41 of the storage server 20. With such configuration, for example, even when the load of the storage server 10 is high, the storage server 20 can transmit data to the client 30 at the same response speed as that of the storage server 10 if the clients 30 accesses the storage server 20 since the cache hint information 31' and the cache hint information 41 are synchronized. Further, by synchronizing the cache hint information 31' and the cache hint information 41, the response speed for providing data to the client 30 can be increased without having the intermediating management server (administrator) 40 if the load on the storage server 10 is high.

Furthermore, in the storage system 1, when the storage server 10 transmits the cache hint information 31' to the storage server 20, a result of receipt may be transmitted to the storage server 10 and/or the management server 40 from the storage server 20. Here, the result of receipt is information indicating that the cache hint information 31' has been received. Note that the setting (flag) of whether to transmit a result of receipt may be included, for example, in the hint transfer request transmitted from the management server 40 to the storage server 10. When the storage server 10 receives the hint transfer request to which the setting that a result of receipt is transmitted has been added, the storage server 10 adds the setting to the cache hint information 31' and transmits it to the storage server 20. Thus, it enables the storage server 20 to transmit a result of receipt to the storage server 10 and/or the management server 40.

If multiple storage servers other than the storage server 10 and storage server 20 exist in the storage system 1, possible relationships between the storage servers of the cache-hint-information transmission source and the storage servers of the cache-hint-information transmission destination would be 1 to 1, M (M: natural number) to 1, 1 to N (N: natural number), and M to N.

Note that in the relationships of 1 to N and M to N, the cache hint information 31 may be transmitted by multicasting (it may be carried out by the other corresponding relationships). With the multicasting transmission, it becomes possible for the storage server of transmission source to transmit the cache hint information 31 without executing the setting and management of the storage servers of transmission destination.

Moreover, the above-provided embodiments are exemplified in connection with a case where the management server 40 detects a failure in a part of the storage servers 10 and 20, but they are not limited to this. For example, it may be arranged that the storage server 10 may be configured to detect a failure occurring in a part of the storage server 20 (another storage server) (for example, a sign of failure of a certain storage device in the storage server 20). That is, the storage servers 10 and 20 may each have the function to detect a failure in the storage servers 10 and 20 explained in connection with the management server 40 so as to be able to detect the occurrence of a failure in other storage servers. With such configuration, if there is a terminal (for example, a computer) which is connected to the network 50 and carries out the setting to the storage servers 10 and 20, the management server 40 is no longer necessary. Thus, it is possible to simplify the configuration for setting up and managing the storage system 1.

Various functions described in the present embodiments may be implemented by a circuit (processing circuit). Examples of the processing circuit include a programmed processor such as a central processing unit (CPU). The processor realizes each of the described functions by executing a computer program (instructions) stored in a memory. The processor may be a microprocessor including an electronic circuit. Examples of the processing circuit also include a digital signal processor (DSP), an application-specific integrated circuit (ASIC), a microcontroller, a controller and other electronic circuit, components. Each of the components other than the CPU described in the embodiments may also be implemented by a processing circuit.

Since each process of the embodiments can be implemented by a computer program, the same advantage as each of the embodiments can be easily achieved by loading the computer program into a general-purpose computer through a computer-readable storage medium that stores the computer program, and executing the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage server comprising:
first tiered storage devices that store data items, the first tiered storage devices comprising at least a first storage device associated with a first tier level, and a second storage device associated with a second tier level and having an access speed slower than that of the first storage device;
a network interface that communicates with each of a client and another storage server through a network, wherein said another storage server comprises second tiered storage devices; and
a processor configured to control the first tiered storage devices and the network interface,
wherein the processor is configured to:
read, when a read request is received from the client through the network interface, a data item designated by the read request from the first tiered storage devices, and transmit the read data item to the client through the network interface;
relocate data items among the first tiered storage devices, the relocated data items comprising a first data item of first access frequency that is moved from the second storage device to the first storage device and a second data item of second access frequency lower than the first access frequency that is moved from the first storage device to the second storage device; and
transmit first information indicative of placement of the relocated data items in the first tiered storage devices as a hint for data relocation among the second tiered storage devices, to said another storage server through the network interface, wherein the first information comprises information indicative of a tier level at which each of the relocated data items is placed.

2. The storage server of claim 1, wherein
when the first data item is placed in the first storage device and the second data item is placed in the second storage device by the relocation of the data items, the first information comprises information indicating that the first data item is placed at the first tier level and information indicating that the second data item is placed at the second tier level.

3. The storage server of claim 2, wherein
when the first access frequency is higher than a threshold value, the first data item is locked in the first storage device and the first information further comprises information indicating that the first data item is locked at the first tier level.

4. The storage server of claim 1, further comprising a memory cache having an access speed higher than that of the first storage device,
wherein the processor is further configured to:
store in the memory cache the data item read from the first tiered storage devices;
determine, when a subsequent read request is received from the client, whether a data item designated by the subsequent read request is present in the memory cache; and
when the data item designated by the subsequent read request is present in the memory cache:
read the data item designated by the subsequent read request from the memory cache; and
transmit the read data item to the client through the network interface, and
wherein the first information further comprises information indicative of the data item stored in the memory cache.

5. The storage server of claim 1, wherein
the processor is further configured to, when a read request from a client is redirected from the storage server to said another storage server, transmit the first information to said another storage server through the network interface.

6. The storage server of claim 1, wherein
the processor is further configured to, when a scheduled date and time to transmit the first information comes, transmit the first information to said another storage server through the network interface.

7. The storage server of claim 1, wherein
the processor is further configured to, if a failure occurs in a part of the storage server, transmit the first information to said another storage server through the network interface.

8. The storage server of claim 1, wherein
the processor is further configured to, if software is added to the storage server, transmit the first information to said another storage server through the network interface.

9. A storage system comprising:
a first storage server comprising:
a first network interface; and
first tiered storage devices that store data items, the first tiered storage devices comprising at least a first storage device associated with a first tier level, and a second storage device associated with a second tier level and having an access speed slower than that of the first storage device; and a second storage server comprising:
a second network interface; and
second tiered storage devices that store data items, the second tiered storage devices comprising at least a third storage device associated with the first tier level, and a fourth storage device associated with the second tier level and having an access speed slower than that of the third storage device,
wherein the first storage server is configured to:
read, when a first read request is received from a client through the first network interface, a data item designated by the first read request from the first tiered storage devices, and transmit the read data item to the client through the first network interface;
relocate data items among the first tiered storage devices, the relocated data items comprising a first data item of first access frequency that is moved from the second storage device to the first storage device and a second data item of second access frequency lower than the first access frequency that is moved from the first storage device to the second storage device; and
transmit first information indicative of placement of the relocated data items in the first tiered storage devices to the second storage server through the first network interface,
wherein the first information comprises information indicative of a tier level at which each of the relocated data items is placed,
wherein the second storage server is configured to:
receive the first information from the first storage server through the second network interface; and
relocate data items among the second tiered storage devices based on the first information, the relocated data items comprising a third data item and a fourth item, wherein the third item corresponds to the first data item and is moved from the fourth storage device to the third storage device and the fourth data item corresponds to the second data item and is moved from the third storage device to the fourth storage device.

10. The storage system of claim 9, wherein
the first information comprises information indicating that the first data item is placed at the first tier level and information indicating that the second data item is placed at the second tier level.

11. The storage system of claim 10, wherein
when the first access frequency is higher than a threshold value, the first data item is locked in the first storage device and the first information further comprises information indicating that the first data item is locked at the first tier level, and
the second storage server is further configured to lock the third data item corresponding to the first data item in the third storage device based on the first information.

12. The storage system of claim 9, wherein
the second storage server is further configured to read, when a second read request is received from a client through the second network interface after relocating the data items among the second tiered storage devices based on the first information, a data item designated by the second read request from the second tiered storage devices and transmit the read data item to the client through the second network interface.

13. The storage system of claim 9, wherein
the first storage server is further configured to, when a read request from a client is redirected from the first storage server to the second storage server, transmit the first information to the second storage server through the first network interface.

14. The storage system of claim 9, wherein the first storage server is further configured to, when a scheduled date and time to transmit the first information comes, transmit the first information to the second storage server through the first network interface.

15. The storage system of claim 9, wherein the first storage server is further configured to, if a failure occurs in a part of the storage server, transmit the first information to the second storage server through the first network interface.

16. The storage system of claim 9, wherein the first storage server is further configured to, if software is added to the first storage server, transmit the first information to the second storage server through the first network interface.

* * * * *